(12) United States Patent
Arroyo et al.

(10) Patent No.: US 10,417,425 B2
(45) Date of Patent: Sep. 17, 2019

(54) SECURED CYBER-PHYSICAL SYSTEMS

(71) Applicant: The Trustees of Columbia University in the City of New York, New York, NY (US)

(72) Inventors: Miguel A. Arroyo, New York, NY (US); Lakshminarasimhan Sethumadhavan, New York, NY (US); Jonathan Weisz, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 180 days.

(21) Appl. No.: 15/618,019

(22) Filed: Jun. 8, 2017

(65) Prior Publication Data
US 2017/0357808 A1 Dec. 14, 2017

Related U.S. Application Data

(60) Provisional application No. 62/349,474, filed on Jun. 13, 2016.

(51) Int. Cl.
*G06F 11/00* (2006.01)
*G06F 21/57* (2013.01)
(Continued)

(52) U.S. Cl.
CPC .......... *G06F 21/57* (2013.01); *G06F 21/554* (2013.01); *G06F 21/566* (2013.01); *H04L 63/1441* (2013.01); *G06F 1/24* (2013.01)

(58) Field of Classification Search
CPC ... G06F 1/24; H04L 63/1441; H04L 2209/84; B60R 16/023
See application file for complete search history.

(56) References Cited

U.S. PATENT DOCUMENTS

| 543,157 A | 7/1895 | Mery |
|---|---|---|
| 9,203,859 B2 | 12/2015 | Sampigethaya |

(Continued)

FOREIGN PATENT DOCUMENTS

| WO | WO2014/107222 | 7/2014 |
|---|---|---|
| WO | WO2016/009356 | 1/2016 |

OTHER PUBLICATIONS

Agbaria, et al. "Overcoming Byzantine Failures Using Checkpointing", System, pp. 1-11.
(Continued)

*Primary Examiner* — Charles Ehne
(74) *Attorney, Agent, or Firm* — Occhiuti & Rohlicek LLP

(57) ABSTRACT

Disclosed are devices, systems, apparatus, methods, products, and other implementations, including a method that includes causing at least one reset for one or more components of a cyber-physical system, the cyber-physical system including a mechanical apparatus with at least one of a mechanical input or a mechanical output, and at least one controller to control operations of at least one of the mechanical apparatus and inhibit computing-based attacks on the cyber-physical system. The method further includes determining, upon resumption of operation of the cyber-physical system following the at least one reset, a post-reset state of the one or more components of the cyber-physical system based, at least in part, on mechanical attributes of the mechanical apparatus following the at least one reset resulting from inertia of the mechanical apparatus during the at least one reset.

24 Claims, 7 Drawing Sheets

(51) Int. Cl.
G06F 21/55 (2013.01)
G06F 21/56 (2013.01)
H04L 29/06 (2006.01)
G06F 1/24 (2006.01)

(56) References Cited

U.S. PATENT DOCUMENTS

| | | | | |
|---|---|---|---|---|
| 9,697,355 | B1* | 7/2017 | Park | G06F 21/552 |
| 2014/0143839 | A1* | 5/2014 | Ricci | H04W 12/06 726/4 |
| 2014/0283047 | A1 | 9/2014 | Dixit et al. | |
| 2015/0378339 | A1 | 12/2015 | Ji | |
| 2016/0088012 | A1 | 3/2016 | Casey et al. | |
| 2017/0093866 | A1* | 3/2017 | Ben-Noon | H04L 9/3234 |

OTHER PUBLICATIONS

Azab, et al. "A Moving Target Defense System", Components, pp. 241-250, 2011.
Braden et al. "Leakage-Resilient Layout Randomization for Mobile Devices", NDSS, February, pp. 21-24, 2016.
Burmester, et al. "Modeling Security in Cyber-Physical Systems", International Journal of Critical Infrastructure Protection, 5(3): 118-126, 2012.
Candea, et al. "Improvintg Availability with Recursive Microreboots: A Soft-State System Case Study", Performance Evaluation, 56(1-4): 213-248, Mar. 2004.
Candea, et al. "Hot Topics in Operating Systems", IX (May): 19-24, 2003.
Candea, et al. "Crash-Only Software", USENIX Association, HotOS IX: The $9^{th}$ Workshop on Hot Topics in Operating Systems, pp. 66-72, 2003.
Cardenas, "Challenges for Securing Cyber Physical Systems", In Workshop on Future Directions in Cyber-Physical Systems Security, p. 5, 2009.
Chow, et al. "Enhancing Cyber-Physical Security Through Data Patterns", Workshop on Foundations of Dependable and Secure Cyber-Physical Systems p. 25, 2011.
Davi, et al. "Code Randomization Resilient to (Just-In-Time) Return-Oriented Programming", In Proceedings 2015 Network and Distributed System Security Symposium, Reston, VA, 2015. Internet Society.
Davi, et al. "Building Secure Defenses Against Code-Reuse Attacks" SpringerBriefs in Computer Science. Springer International Publishing, Cham, 2015.
Design Flaws Expose Drones to Hacker Attacks: Researcher/Security Week. Com.
Ding, et al. "Recovery-Oriented Computing: Main Techniques of Building Multitier Dependability", 1, 2007.
Fawzi, et al. "Secure Estimation and Control for Cyber-Physical Systems Under Adversarial Attacks", IEEE Transactions on Automatic Control, 59(6): 1454-1467, Jun. 2014.
Hatton, et al. "N-Version Design Versus One Good Version", IEEE Software, 14(6):71-76, 1997.
Ivanov, et al. "Attack-Resilient Sensor Fusion for Safety-Critical Cyber-Physical Systems", ACM Transactions on Embedded Computing Systems, 15(1):1-24, 2016.

Kim, et al. "Cyber-Physical Systems" A Perspective at the Centennial, Proceedings of the IEEE, 100 (Special Centennial Issue): 1287-1308, 2012.
Kisner, et al. "Cybersecurity Through Real-Time Distributed Control Systems", Number Feb. 2010.
Koscher, et al. "Experimental Security Analysis of a Modern Automobile", in 2010 IEEE Symposium on Security and Privacy, pp. 447-462, IEEE, 2012.
Larsen, et al. "Automated Software Diversity", 2014 IEEE Symposium on Security and Privacy, pp. 276-291, 2014.
Le, et al."Applying Microreboot to System Software", Proceedings of the 2012 IEEE $6^{th}$ International Conference on Software Security and Reliability, SERE 2012, pp. 11-20, 2012.
Lee, et al. "German Steel Mill Cyber Attack", pp. 1-15. 2014.
Lu, et al."Towards a Framework for Assuring Cyber Physical System Security", International Journal of Security and its Applications, 9(3):25-40, 2015.
Mitchell, et al. "A Survey of Intrusion Detection Techniques for Cyber-Physical Systems", ACM Comput. Surv. 46(4):55:1-55:29, Mar. 2014.
Mo, et al. "Cyber-Physical Security of a Smart Grid Infrastructure", vol. 100(1): pp. 210-224, Jan. 2012.
Neuman, et al. "Challenges in Security for Cyber-Physical Systems", Workshop on Future Direction in Cyber-Physical Systems Security, pp. 1-4, 2009.
Oh, et al. "Error Detection by Duplicated Instructions in Super-Scalar Processors", IEEE Transactions on Reliability, 51(1): 63-75, 2002.
Oppenheimer, et al. "Why do Internet Services Fail, and What can Be Done About it?", Proceedings of the $4^{th}$ Conference on USENIX Symposium on Internet Technologies and Systems-Volume 4, pp. 1-1, 2003.
Pajic, et al. "Robustness of Attack-Resilient State Estimators", pp. 163-174, Apr. 2014.
Papadogiannakis, et al. "Architectural Support for Instruction Set Randomization", In Proceeding of the 2013 ACM SIGSAC Conference on Computer & Communications Security, pp. 981-992, ACM, 2013.
Pappas, et al. "Practical Software Diversification Using In-Place Code Randomization", In Moving Target Defense II, pp. 175-202, Springer, 2013.
Portokalidis, et al. "Fast and Practical Instruction-Set Randomization for Commodity Systems", In Proceedings of the $26^{th}$ Annual Computer Security Applications Conference, ACSAC 10, pp. 4148, New York, NY USA, 2010.
Portokalidis, et al. "Toward A Comprehensive Defense Against Unauthorized Code Execution", In Moving Target Defense, pp. 49-76. Springer, 2011.
Shepard, et al. "Evaluation of Smart Grid and Civilian UAV Vulnerability to gps Spoofing Attacks", In Proceedings of the ION GNSS Meeting, vol. 3, 2012.
Sridhar, et al. Cyber-Physical System Security for the Electric Power Grid, vol. 100(1): pp. 210-224, Jan. 2012.
Van Renesse, et al. "Chain Replication for Supporting High Throughput and Availability", Proceeding of the $6^{th}$ Conference on Symposium on Opearting Systems Design & Implementation—vol. 6, p. 7, 2004.

* cited by examiner

SECURED CYBER-PHYSICAL SYSTEMS

CROSS-REFERENCE TO RELATED APPLICATIONS

This application claims the benefit of, and priority to, U.S. Provisional Patent Application Ser. No. 62/349,474, entitled "YOLO: A NEW SECURITY ARCHITECTURE FOR CYBER-PHYSICAL SYSTEMS," and filed Jun. 13, 2016, the content of which is incorporated herein by reference in its entirety.

STATEMENT REGARDING FEDERALLY SPONSORED RESEARCH

This invention was made with government support under N00014-15-1-2173 awarded by the Office of Naval Research (ONR). The government has certain rights in the invention.

BACKGROUND

Cyber-physical systems (CPS) represent the synthesis of computational and physical processes encompassing a wide range of applications including transportation, medical devices, robots and power grids. CPS are defined by their unique characteristics involving feedback control loops with the physical world. The hybrid nature of CPS introduces new possible attack vectors that encompass both the physical and cyber realms, leading to a number of incidents in recent years. The goal of these attacks is to elicit incorrect and potentially dangerous behavior by compromising the physical operation of the system.

SUMMARY

In some variations, a method is provided that includes causing at least one reset for one or more components of a cyber-physical system, the cyber-physical system including a mechanical apparatus with at least one of a mechanical input or a mechanical output, and at least one controller to control operations of at least one of the mechanical apparatus and inhibit computing-based attacks on the cyber-physical system. The method further includes determining, upon resumption of operation of the cyber-physical system following the at least one reset, a post-reset state of the one or more components of the cyber-physical system based, at least in part, on mechanical attributes of the mechanical apparatus following the at least one reset resulting from inertia of the mechanical apparatus during the at least one reset.

Embodiments of the method may include at least some of the features described in the present disclosure, including one or more of the following features.

Causing the at least one reset may include causing recurring resets for the one or more components of the cyber-physical system.

Determining the post-reset state of the one or more components may include determining the post-reset state of the one or more components based further on one or more previous inputs received by the cyber-physical system prior to a beginning of the at least one reset.

The method may further include selecting one of multiple available process variants for at least one process implemented by the cyber-physical system.

Selecting the one of the multiple available process variants may include providing the multiple available process variants according to one or more of, for example, leakage-resilient layout randomization techniques, Isomeron techniques, instruction set randomization techniques, etc.

The method may further include terminating use of the selected one of the multiple available process variants for the at least one process upon a next reset of the cyber-physical system. The method may additionally include selecting another of the multiple available process variants for the at least one process for execution by the at least one controller upon the resumption of the operation of the cyber-physical system following the next reset.

The method may further include obtaining measurements from one or more sensors of the cyber-physical system indicative of a state of the one or more components of the cyber-physical system, determining respective estimates of the state corresponding to the one or more components of the cyber-physical system based on the measurements from the one or more sensors, and resetting the at least one controller in response to a determination of a discrepancy between two or more estimates of the state corresponding to the one or more components determined from the respective measurements. Obtaining the measurements from the one or more sensors may include obtaining measurements from multiple engine position decoders indicative of an engine state of an engine.

The method may further include periodically re-computing state data for the one or more components of the cyber-physical system. Periodically re-computing data for the one or more components may include periodically re-computing a task schedule for an engine, the task schedule comprising control signals to control one or more of, for example, an engine ignition task, and/or an engine injection task.

Causing the at least one reset for one or more components of the cyber-physical system may include one or more of, for example, re-booting, at least in part, the one or more components of the cyber-physical system, and/or restoring a previously saved state for the one or more components of the cyber-physical system.

Causing the at least one reset for the one or more components of the cyber-physical system may include adaptively regulating recurring reset intervals based, at least in part, on one or more of, for example, environmental conditions affecting the cyber-physical system, changes to the environmental condition, location of the cyber-physical system, and/or a previous state of a previous reset.

In some variations, a cyber-physical system is provided that includes a mechanical apparatus configured for at least one of, for example, receive one or more mechanical inputs, or provide one or more mechanical outputs, and at least one controller to control operation of the mechanical apparatus and to inhibit computing-based attacks on the cyber-physical system. The at least one controller is configured to cause at least one reset for one or more components of the cyber-physical system, and upon resumption of operation of the cyber-physical system following the at least one reset, determine a post-reset state of the one or more components of the cyber-physical system based, at least in part, on mechanical attributes of the mechanical apparatus following the at least one reset resulting from inertia of the mechanical apparatus during the at least one reset.

In some variations, a non-transitory computer readable media is provided, that is programmed with instructions, executable on a processor, to cause at least one reset for one or more components of a cyber-physical system, the cyber-physical system comprising a mechanical apparatus with at least one of a mechanical input or a mechanical output, and at least one controller to control operations of at least one of the mechanical apparatus and inhibit computing-based attacks on the cyber-physical system. The instructions further include one or more instructions to determine, upon resumption of operation of the cyber-physical system following the at least one reset, a post-reset state of the one or more components of the cyber-physical system based, at least in part, on mechanical attributes of the mechanical apparatus following the at least one reset resulting from inertia of the mechanical apparatus during the at least one reset.

In some variations, an apparatus is provided that includes means for cause at least one reset for one or more components of a cyber-physical system, the cyber-physical system comprising a mechanical apparatus with at least one of a mechanical input or a mechanical output, and at least one controller to control operations of at least one of the mechanical apparatus and inhibit computing-based attacks on the cyber-physical system. The apparatus further includes means for determining, upon resumption of operation of the cyber-physical system following the at least one reset, a post-reset state of the one or more components of the cyber-physical system based, at least in part, on mechanical attributes of the mechanical apparatus following the at least one reset resulting from inertia of the mechanical apparatus during the at least one reset.

Embodiments of the cyber-physical system, the computer-readable media, and the apparatus may include at least some of the features described in the present disclosure, including at least some of the features described above in relation to the method.

Details of one or more implementations are set forth in the accompanying drawings and in the description below. Further features, aspects, and advantages will become apparent from the description, the drawings, and the claims.

BRIEF DESCRIPTION OF THE DRAWINGS

These and other aspects will now be described in detail with reference to the following drawings.

Like reference symbols in the various drawings indicate like elements.

DESCRIPTION

Figure 1:
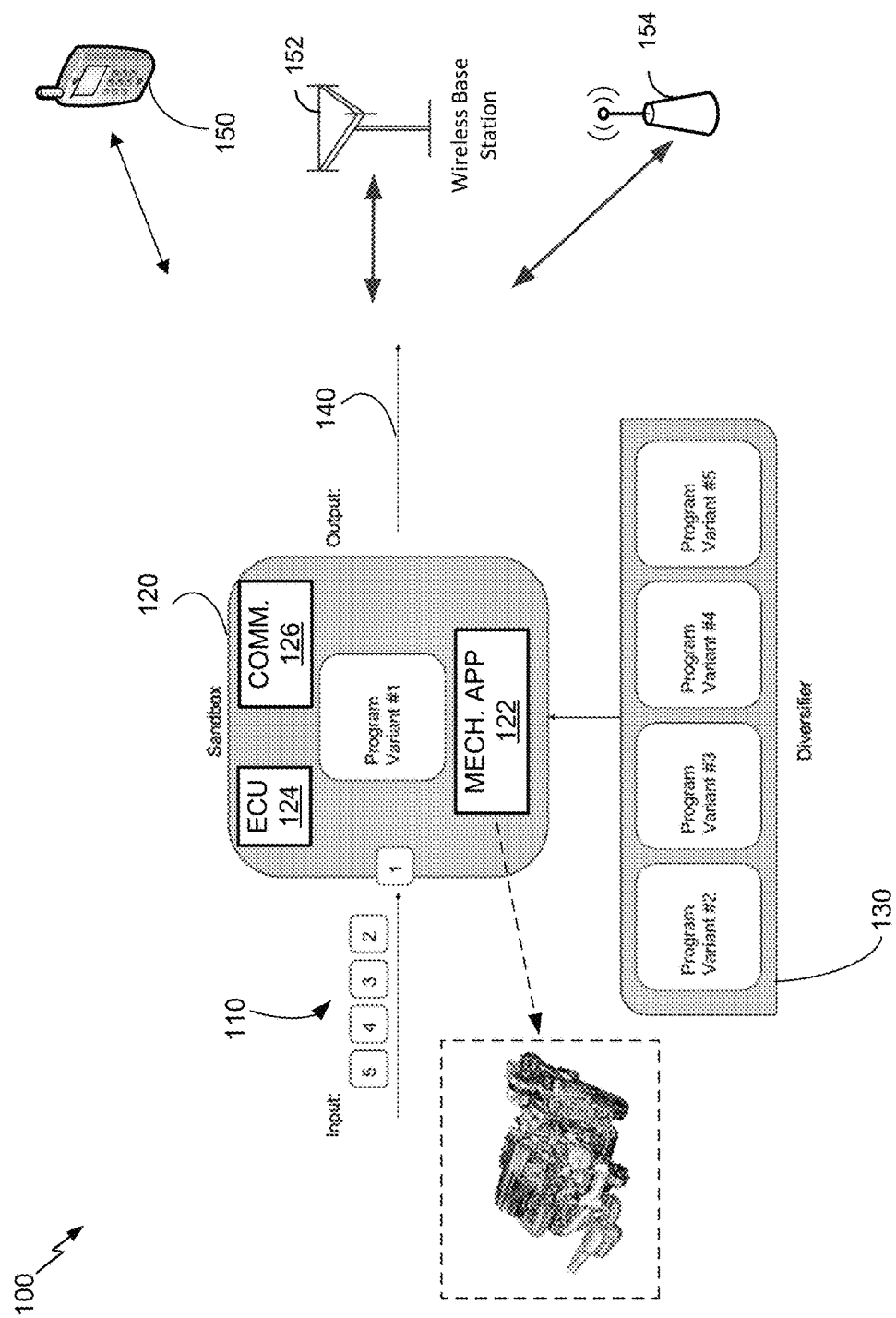
FIG. 1 is a diagram of a high-level architecture of a security system to inhibit attacks on a cyber-physical system.

Described herein are systems, devices, apparatus, methods, computer program products, media, and other implementations, including a resilient secure reset (RSR), also referred to as YOLO (which stands for "You Only Live Once"), security architecture. The implementations described herein, including the RSR security architecture, leverage two physical properties of a cyber-physical system (CPS) to survive CPS attacks. These properties include inertia, which is the tendency of objects to stay at rest or in motion, and CPS' built-in resiliency and reliability to intermittent faults and noise. At a high level, the implementations described herein aim to use new diversified variants for every new set of sensor input to the CPS. The delays involved in RSR/YOLO, viz., the delays for rebooting and diversification, can be absorbed by the CPS because of the inherent inertia and its ability to withstand minor perturbations. The RSR implementations described herein were realized and tested on an open source Car Engine Control Unit, to obtain measurements from a real car engine, to demonstrate that the RSR security architecture is imminently practical. The RSR implementations described herein were also evaluated on a Flight Controller (FC) for a quadcopter, which needs more sophisticated control because of the presence of multiple rotors. For both of the different test platforms, it was found that these systems tolerated multiple frequent resets.

The implementations described herein can be explained with an example. Consider a car: even if power is cut off to the car engine, the car will continue to run due to inertia; similarly, even if one or few sensor inputs are incorrect, the car will continue to work correctly because intermittent sensor errors can occur naturally, and the car's controllers are configured to handle this case. RSR, and the other implementations described herein, takes advantage of these features. Particularly, in some embodiments, the system is intentionally reset (e.g., rebooted, restored to some saved state snapshot, or some other reset operation) periodically to clear "tainted" state left by an attacker. During resets, system inertia is relied upon for the system to continue working. To mitigate vulnerabilities between resets, diversification techniques are used to force an attacker to develop a new attack strategy for different inputs.

Generally, security in cyber-physical system (or CPS) is a full-system property. This means that all aspects of the system including its configuration, construction and operation should be secure for the system to be secure. A CPS, broadly speaking, has three attack surfaces: the CPS' interface to the physical world through sensors and actuators, the controller and all software running on it, and the network that connects the controller to the sensors and actuators. In some of the embodiments described herein, a minimalist CPS model is considered in which the controller (e.g., engine-control unit, or ECU, when the cyber-physical system includes an engine). This means that it is assumed that the hardware and software functionality available in the system is solely that required to support correct control over the physical plant of the system. The rationale for this choice is to focus attention on aspects that are unique to CPS.

There are several types of attacks surfaces that may be employed by an attacker to mount an attack against a CPS. One attack surface that can be exploited by an attacker is that of the CPS' sensors and actuators. The CPS's interface to the physical world is typically through sensors and actuators. This attack surface is therefore susceptible to physical threats such as tampering of sensors and/or actuators, sensor spoofing and jamming. Another attack surface that may be used by an attacker is that of software, namely, targeting the control software that handles incoming queries, processes sensor data, and computes actuator commands. This surface is susceptible to the more traditional software threats such as those stemming from memory vulnerabilities, integer overflows, etc. A third type of attack surface is that of a network attack surface (attacking the network that connects the various components to the controller). This attack surface is susceptible to threats such as man-in-the-middle type attacks. Yet another type of attack includes the physical-subsystem attacks. Physical attacks typically target state estimation and control. Attacks on state estimation usually manifest themselves in one of two ways: sensor spoofing and sensor jamming. The difference between these two threats is effectively in the level of control that can be exerted over the sensor, with spoofing being more sophisticated than jamming. Most, if not all of these physical attacks require a degree of spatial proximity. The jamming or spoofing device needs to keep up with the motion of the CPS for continued action. While these attacks are physical in nature, they can affect the cyber component of the system and provide the opportunity for certain cyber-attacks to become effective. For example, they may indirectly trigger certain vulnerabilities, such as integer overflows and underflows. Maliciously manipulated sensor values can cause incorrect branches to be executed in the control processes and algorithms, or worse, trigger CPU specific vulnerabilities.

Due to platform differences, attacks in the cyber portion of a CPS are a subset of those seen on more traditional systems. However, memory vulnerabilities, such as code reuse and data corruption, are as much a problem for CPS as for other systems. Thus, the minimalist CPS offers attackers a rich set of attack vectors. Attackers can spoof/corrupt sensor inputs, or attack the network connection between the controller and the sensor (e.g., through debug ports, overwriting the configuration state and/or the control process using some physical access, and so on).

The following assumptions are made about adversarial capabilities: 1) the adversary's main objective is to inhibit correct operation of the physical process being controlled, 2) the adversary has access to the source code of the system and/or the underlying control processes/algorithms being used, 3) the adversary can spoof input signals for some bounded duration until correct signals are again received (sensor data authentication techniques, such as GPS authentication, or physically distributed redundant sensors, can be used to provide this guarantee), and 4) the controller software is not bug-free (e.g., a bad sensor input may result in a integer overflow vulnerability that may be escalated to number of different vulnerabilities). With these assumptions in mind, many forms of classical attack vectors are available. For example, in an ECU, certain engine configuration parameters are application and engine specific. A car is tuned by empirical observation, and therefore even a minimal engine controller must support reconfiguration over an external interface, which is usually accessible through a network. Such an interface presents an opportunity for both remote and local exploits.

With reference to FIG. 1, an example overview of the architecture of a secured system 100 implemented to inhibit attacks on a cyber-physical system is shown. The system 100 includes the cyber-physical system 120, which comprises a mechanical apparatus 122 (e.g., an engine, a flight controller, an appliance, an Internet-of-Things device, and/or other devices that can be controlled), and a controller 124 (also referred to as an engine control unit, or ECU, which will be discussed in greater details below) that is implemented to control the mechanical apparatus 122 and which is configured to inhibit computing-based attacks on the cyber-physical system. The mechanical apparatus 122 generally includes one or more input devices, such as sensors, an input interface to the mechanical apparatus, etc., and at least one output device or module (e.g., an engine's piston) that is actuated or controlled based, in part, input received via the one or more input devices. The controller 124 may be a processor-based controller, an ASIC, a state-machine, or any other type of controller that is configured to perform one of multiple process variants to operate the cyber-physical system 120 (e.g., to retrieve into a memory area one of a multiple of computer-readable implementations of the variants, and execute the retrieved variant). The controller 124 is coupled to the mechanical apparatus 122 via an electrical or electrical mechanical interface/connection (not shown in FIG. 1). In some embodiments, the controller 124 may be part of (e.g., integrated into) the mechanical apparatus 122.

In some embodiments, the cyber-physical system 120 further includes a communication module 126 that allows establishment of communication links to one or more remote devices, such as, for example, a mobile wireless device 150, a WWAN node 152 (e.g., cellular base station), a WLAN node 154 (a WiFi access point), etc. Each of these remote devices may, in some embodiments, be in communication with a remote server through which communication links to the cyber-physical system 120 may be established. The communication module 126 may also be connected to the ECU and/or the mechanical apparatus 122 via an electrical (e.g., a bus) or some electro-mechanical interfacing device. The communication module 126 allows remote access to the cyber-physical system 100 to provide data (e.g., input data from wireless sensors), to implement periodical control updates (e.g., software updates), and so on. The existence of the communication module 126 also creates a vulnerability in the security of the cyber-physical system 120, which may be exploited by a rogue third-party attacker.

The communication module 126 may be configured to receive and/or transmit wireless communications according to one or more communication protocols or technologies, including WLAN communication protocols, short range communication protocols (Bluetooth, Bluetooth Low Energy, RFID, etc.), WWAN communication protocols, etc. Any of the depicted devices and nodes of system 100 may be elements in various types of communications networks, including a wide area wireless network (WWAN), a wireless local area network (WLAN), a wireless personal area network (WPAN), and so on. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. A WLAN may include, for example, an IEEE 802.11x network. A WPAN may include, for example, a Bluetooth network (including one based on Bluetooth Low Energy protocol), an IEEE 802.15x, RDID-based networks, other short range communication networks, etc. In some embodiments, 4G networks, Long Term Evolution ("LTE") networks, Advanced LTE networks, Ultra Mobile Broadband (UMB) networks, and all other types of cellular and/or wireless communications networks may also be implemented and used with the systems, methods, and other implementations described herein.

Because, in some embodiments, the cyber-physical system 120 is implemented with an RSR/YOLO-ized controller that is an event driven process, the cyber-physical system 120 is referred to, in FIG. 1, as a sandbox (in which existing configuration are periodically erased to accommodate new configurations At time $t_0$ a particular process (e.g., program) variant is loaded into a sandbox where it waits for an input (which is one of the periodical inputs of an input sequence 110, and may be obtained/measured by one of the sensors of the mechanical apparatus 122 or be any other sensor providing input to the CPS 120), and may be executed/performed using the controller 124. At time $t_1$ an input arrives where the current process variant is used to process it. Once the input has been processed, its respective output (marked as output 140, which, in this example, is a temporal sequence of outputs, and may include output of the mechanical apparatus 122), leaves the sandbox (cyber-physical system) 120, the sandbox may be reinitialized, i.e., reset (e.g., rebooted), and a second program variant (selected from a set of processes 130) may be loaded. This continues through-out the lifetime of the controller. Each sensor input and each variant are only allowed to affect the control system over a well-defined life span (hence the YOLO acronym). Thus, any attacker that succeeds in gaining control over the sandboxed program will have control until some expected runtime of the system expires, and the process/program is replaced by a new variant. Accordingly, in some embodiments, a cyber-physical system is provided that includes a mechanical apparatus configured for at least one of receive one or more mechanical inputs and/or provide one or more mechanical outputs, and at least one controller to control operation of at least one of the mechanical apparatus. The at least one controller is implemented to inhibit computing-based attacks on the cyber-physical system, and as such the at least one controller is configured to cause at least one reset for one or more components (e.g., sensors, task schedulers, etc.) of the cyber-physical system. The at least one controller is configured to, upon resumption of operation of the cyber-physical system following the at least one reset, determine a post-reset state of the one or more components of the cyber-physical system based, at least in part, on mechanical attributes of the mechanical apparatus, following the at least one reset, resulting, in part, from inertia of the mechanical apparatus during the at least one reset.

Use of multiple variants to inhibit or thwart attacks may, in some implementations, be realized through diversification functionality. The goal of an RSR/YOLO system (to implement a secure cyber-physical system) is to increase confidence that the system is functioning as designed the majority of the time. As noted, this can be achieved by recurring reset actions (e.g., micro-reboot, restored state snapshot, etc.) that return the system to a well-modeled state.

Recurring resets can be performed periodically (i.e., at substantially regular intervals), non-periodically/aperiodically (e.g., according to some varying interval that can be determined based on one or more criteria), or at some randomized interval length. Thus, in some embodiments, the recurring resets are implemented so that the length of a reset interval, $T_R$, is adaptively regulated (e.g., to vary it between an upper and lower bound) based, for example, on environmental conditions, and/or changes to it, for an environment in which the CPS system is deployed. The adaptively regulated recurring reset may also be based on such factors as a location of the cyber-physical system, a state/status of a previous reset (e.g., determine whether the previously caused reset has been completed). For example, and as will be discussed in greater detail below, for the quadcopter-based system for which the CPS implementations were tested, the quadcopter was subjected to a variety of external forces, and thus, the reset period was adaptively varied according to, for example, wind forces experienced by the quadcopter, according to its spatial orientation, and/or based on other parameters affecting the operation of the quadcopter.

Operation of the CPS in which the recurring resets occur at fixed intervals is referred to as periodic mode of operation. Operation of the CPS in which the interval between resets is randomly picked (from a pre-determined range that is considered to be safe) is referred to as random mode of operation. Operation of the CPS to adaptively regulate its reset interval is referred to as adaptive mode of operation, in which the interval between resets is dependent on a certain set of criteria. In the adaptive mode of operation, the system or an observer monitors the effects of a reset and selectively chooses when to execute the reset. This mode, as well as other modes of operation, have their own security strengths and weaknesses. The adaptive strategy may be able to provide the closest performance to the normal system by continuously monitoring its effects and is specifically meant to address safety. If there is a chance that operation/actions of the CPS would violate any of the safety requirements of the CPS, the reset period can be regularly varied between an upper and lower bound. The difficulty with this strategy is determining the appropriate metric to monitor, which may vary from system to system.

Even with recurring (e.g., uniform, adaptive, or random) resets, CPS systems may be vulnerable to attacks during windows between the periodic resets, where an attacker can exploit the system between, for example, micro-reboots. Diversification techniques can lower the likelihood that an attacker can successfully exploit the system between resets. Further, with diversification, an RSR implementation can perform micro-reset actions less frequently, reducing the performance penalties associated with them.

Generally, the RSR/YOLO paradigm is agnostic to the diversification techniques. However, the additional delays imposed by these techniques should not affect the real-time deadlines of the cyber-physical system. These overheads vary from strategy to strategy, and are usually the result of encryption/decryption, random number generators, and additional read/writes required for their implementations. By leveraging the security that diversification provides while the program is running, the performance tradeoff can be studies by varying system uptime and reset (e.g., reboot) frequency. An RSR-based implementation can also mitigate the impact of diversification by performing computation tasks as background jobs.

The challenge in realizing the model described herein for CPS is that most systems have feedback loops that operate on prior state. Constant and naive resetting at unexpected times may cause errors in the control procedure. Further the computational resources are fairly constrained compared to traditional systems. As described herein, these challenges can be mitigated to capture the benefits of RSR/YOLO in pragmatic ways. There are two features that help overcoming these challenges. First, even though most control systems are closed loop systems, for the brief period during a reset (e.g., a reboot) they can be considered as open loop systems. During this period, inertia of the CPS system (e.g., of the physical/mechanical portion of the system) can be relied upon to overcome incorrect outputs from the control processes. Second, the state estimation routines in CPS can be changed to account for tainted states. The basic idea here is to estimate the state using, for example, a sliding window that contains all but the latest input in order to estimate state. While this creates a small error in state estimation, the effect is similar to a single faulty sensor reading that most CPS control processes are already configured to handle and mitigate.

In some embodiments, the CPS system may be controlled so as to stay within a safe region of operation, which can also impact the timing of the reset of the CPS system. For example, a CPS system may be implemented to ensure that the system under control stays in the safe region during the course of a flight (e.g., of an airborne CPS system, such as a quadcopter) and that perturbations do not cause instability (e.g. the flight does not oscillate indeterminately). If an RSR implementation is blindly applied to a legacy system, depending on the original system parameters, the RSR implementation may cause instabilities which could result in unsafe operation. However, mimicking the noise characteristics of the system at hand using resets can mitigate this problem. If this type of mimicry is not possible, the RSR implementation can gracefully shutdown or provide sub-optimal operation until the CPS system returns to a safe mode.

While, in some embodiments, the RSR/YOLO implementations may be stateless, in other embodiments, certain controller software might require state to be persisted to provide certain functionality. For example, it is possible that some CPSs may need to persist data to non-volatile memory. One scenario in which this arises is logging. Given the recurrence (e.g., periodicity) of resets, this may be difficult since there may not be enough time to allow for writes. To handle this limitation and capture data for evaluation, the system may be realized to include an additional logging device that listens to sensor data. This logging device does not need to be tied to the control of the system. Other approaches may be possible depending on the reset strategy. In embodiments in which control processes require states to persist in volatile memory across reset boundaries, resets may not be able provide recovery, and RSR may need to rely on the strength of diversification to prevent corruption. Depending on the assurances needed about the persisted state, given that the size of state is typically small, designers can also consider using a stronger protection mechanism such as encryption.

Figure 2:
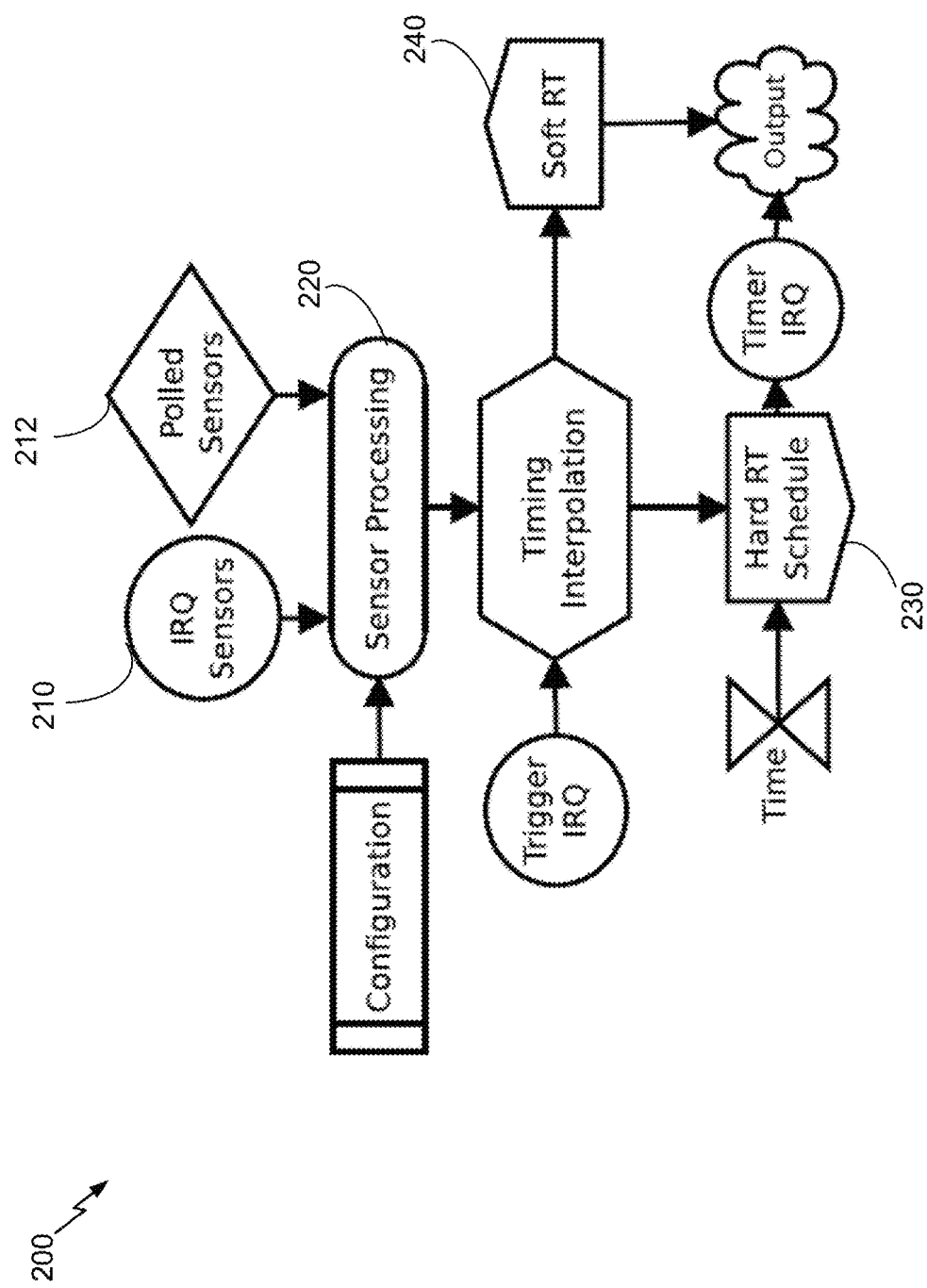
FIG. 2 is a diagram of an example architecture (implemented in hardware, software, or a combination of hardware and software) for a controller (e.g., an engine control unit).

FIG. 2 is a diagram of an example architecture (implemented in hardware, software, or a combination of hardware and software) for an example engine control unit (ECU) 200 that may be similar to the controller 124 (separately from, or in combination with, the mechanical apparatus 122) depicted in FIG. 1. The ECU 200 may be used to realize the RSR paradigm described herein, e.g., recurring resetting of the cyber-physical system, optionally combined with selection and use of variant processes. The ECU is an often used system representative of many CPS (which may include engines, as well as other types of mechanical apparatus) as it realizes a broad cross section of the challenges that make them different from traditional computer systems. An ECU is the brain of an engine, designed to directly process inputs from a series of sensors and manage actuators (e.g., to control the process of internal combustion, in the case of an engine). As is common in CPS, an ECU must perform a set of real-time tasks to ensure proper engine functionality. For an engine to produce power, it must inject fuel into its internal chamber, mix it with air by controlling the timing of valves, and, finally, ignite the air-fuel mixture so that it combusts and rotate the shafts connected to the transmission. Typical engines perform these operations/steps in what is called the four-stroke cycle. For the ECU to enable the actuators that control this process, it must be able to correctly decode the position of the engine with respect to the four-stroke cycle.

As shown in FIG. 2, the ECU 200 is configured as an event driven process that manages two types of sensors: polled and interrupt driven. In implementations where the mechanical apparatus being managed by the controller is an engine, the controller receives input from IRQ sensors 210 which provide input critical to proper operation of the engine, and include sensors providing engine position event inputs and ADC sensors that generate interrupts. Other less critical sensors such as coolant temperature and engine air flow can be provided via polled sensors 212 on demand, and as needed. Data from the sensors is then processed by a sensor processing module 220 and used for state estimation. Control processes then schedule hard real-time tasks (at a Hard RT Scheduler 230), such as injection and ignition, and soft real-time tasks (at a Soft RT Scheduler 240) such as reporting speed to the speedometer.

As noted, cyber-physical systems (CPS) have properties that impact the vulnerability to attacks. There are two main physical properties of cyber-physical systems that can be used to counter those vulnerabilities. The first one is the physical property of inertia, which is the resistance of an object to change in its motion. This principle is important as it asserts that the physical components of the system should continue operating in some state without any external forces. In fact, physical systems are sometimes engineered to take advantage of this property. One early example of such a system was the hit-and-miss engine in which an engine fires and coasts for some time before it fires again to maintain its average speed. Today, high performance cars will allow the driver temporarily disable fuel ignition in order to shift gears quickly without depressing the accelerator. A second physical property of cyber-physical system that is relevant to the issue of system security as implemented herein is the resilience of the control processes managing the cyber-physical systems. Many CPS are expected to perform in situations where their inputs are subject to unavoidable sources of environmental noise and interference. Thus, processes are implemented to tolerate certain amounts of error and still function correctly. While this tolerance may not necessarily provide robustness against a malicious attacker, it allows for defenses that can exploit this robustness.

Depending on the adversaries' objectives, they may or may not be interested in disturbing the physical process under control. If the goal of an adversary is simply to extract information, the attack time will simply correspond to the exploit time. However, given the types of attacks seen in practice, the adversary's goals often involve compromising the physical system. Inertia and other physical properties limit the rate of change of the system. This means that attacks take longer as they not only involve the exploit, but the time an adversary requires to influence the system to meet his/her goals. For example, some studies have been conducted to analyze how these physical properties are used by intrusion detection techniques to place bounds on the rate an adversary disturbs the system. These studies have found that if the adversary's rate of attack can be made sufficiently slow, the physical properties will allow the system to resist the negative effects of the attack. In turn this means the system still meets its original objective. RSR similarly relies on the assurances of the physical properties to resist the negative impact of attacks until the next reset period.

Control architecture for cyber-physical systems thus have an effect on securing such cyber-physical systems from third-party attacks. Cyber-physical systems are typically structured as event driven programs. The flow of the control process follows sensor updates, triggering the system to calculate new state estimates derived from that data which then affect its behavior. This control paradigm lends itself to being more easily restructured and modeled. Cyber-physical system controller processes typically require state history to estimate observations of the physical environment. Some example states associated with a cyber-physical system include:

1. Application Configuration State—A state type which once set is rarely set again. Examples include controller gains and user defined constants.
2. Hardware Configuration State—A state type that can differ from what was originally configured to what is currently set in the hardware. Examples include the privilege level or the clock source of the processor, and hardware peripherals.
3. Cached Event State—A state type which records sensor inputs. Examples include buffered analog inputs and buffered communication channels.
4. Multi-period State—A state type that is estimated across multiple periods of the system. Examples include speed and acceleration estimations.

At a minimum, a cyber-physical system should be expected to have statefulness of types 1 and 2. Any feedback loops in the system imply the existence of types 3 and 4 (cached event state and multi-period state).

When considering any system, especially systems, such as cyber-physical systems, that are updated infrequently, it is a difficult challenge to build a defense that can protect against all possible future intrusions. Instead, the RSR-based implementations described herein aim to prevent or inhibit persistent threats from establishing a stronghold on the system. It does so by emphasizing recoverability methods which attempt to restore the system to a well-modeled state. As noted, RSR-based implementations take advantage of two orthogonal, but complementary security techniques: reset (e.g., reboot) and diversification. In combination with the inherent inertial properties of cyber-physical systems, these two techniques can be used to construct an environment where a particular diversified program is used once to process an incoming input before another variant is used. Under the RSR paradigm, any input must have a bounded time horizon over which it can affect the system. Ideally, any exploitable subsystem only affects the system for the minimum possible time before being terminated, replaced, or reinitialized. Additionally, no single exploit should succeed on a particular subsystem more than once.

There are two key properties of cyber-physical systems that make the task of YOLO-izing a system challenging: statefulness, and the observability of the physical state. Many control processes require state history to estimate certain values. A state history is even more important when it is used to bridge the gap between program state and physical properties that can only be observed intermittently, such as switch or clock signals. These two aspects require that an RSR-based implementation be able to maintain or re-synchronize consistency with the physical environment to ensure correct behavior.

The first strategy to be considered for counteracting attacks is to cause controlled resets, e.g., re-boots, restoration of a previously saved state snapshot, etc., of the cyber-physical system. In implementing such controlled resets, for example controlled reboots, the goal for each of the above example state types is to allow partial reboots that reduce the overhead compared to simple rebooting, and to do in a way that does not compromise the isolation that rebooting is meant to achieve. From the point of view of thwarting an attacker, the restoration of state typically involved with a reboot helps prevent an attacker's ability to gain a persistent method of execution. In a reboot, important hardware parameters such as core registers and peripheral configurations that define things such as interrupts, are brought back to a default value. At any later phase in execution, the combinatorics explosion of potential states makes validation more difficult. Although a realistic cyber-physical system requires stateful, closed feedback loops, due to cyber-physical system properties such as inertia, a cyber-physical system can operate as an open feedback system for a bounded period of time. This allows resetting (e.g., rebooting) the system and return to a well-defined state when a particular piece of state becomes corrupted. In most situations, simple resetting can incur a high penalty especially in the context of a cyber-physical system degrading optimal performance. Several factors can contribute to the high overhead, the first being the downtime the chip requires to effect a reset. Another factor involves the default values taken by peripheral devices which may have unintended physical consequences. A further factor involves the efficiency of the startup routines and warm-up times of certain functionality. Unlike traditional computing environments, where resetting occurs at the second time scale, reset times for microcontrollers and cyber-physical software is an order of magnitude faster occurring at the millisecond scale. Additionally, the physical components typically controlled occur at human time scales which allows tolerating the reset times. However, to reduce this cost and achieve closer to optimal performance, a layered approach of micro-resets (e.g., micro-reboots) is defined, where each consecutive layer is more expensive and intrusive. Micro-resets involve the individual resetting of fine-grained application components, commonly known as micro-services. YOLO's overarching strategy of micro-reset layers is to explicitly attempt to forget a given input as quickly as possible, limiting the effects of any malicious input. This can be accomplished, in some embodiments, by recalculating the system state as though that input had not been observed. The control processes/algorithms can tolerate this missed input as if it were noise, leading to imprecise estimations that still allows continued operation of the system, even such operation is somewhat sub-optimal. If this cannot be done, the state may be reset to some default value and all micro-services which depend on the discarded values are recursively recomputed. Under certain circumstances, when system state recalculation lead to faulty behavior, the hardware platform can be reset, in which case the RSR/YOLO implementation relies on the property of inertia to allow recovery without catastrophic failure.

Consider a first implementation of controlled reset for an application configuration state class of a cyber-physical. An adversary that manages to attack during this state can corrupt, for example, the calibration parameters of engine temperature sensors causing the CPS to overheat. To remedy this type of attack, RSR-based implementations exploit the static nature of most configuration state, to perform a validation process. Particularly, engine tuning parameters and configuration may be cryptographically signed when updated. The signature is validated against the current configuration periodically in non-real-time background threads. When configuration states differ from the expected value, a valid default is checked out from a secure store (e.g., allocating a memory region protected by the MPU).

Next, for the hardware configuration state, it can first be observed that the default hardware state for different peripherals can trigger actuators at incorrect times. For example, consider a peripheral which is configured to control an actuator expecting a logic low to trigger and the default peripheral reset state sets it to be a logic low. Under this scenario, resetting the peripheral can adversely affect the engine's optimal performance by issuing an injection or ignition event at inappropriate times. These issues can be alleviated by triggering the peripheral reset as a last resort. RSR implementations do so by implementing a device driver abstraction to maintain correct hardware state synchronization. This approach requires that each device driver contain three processes: validate, initialize, and reset. In the validate process, the consistency of device control registers is verified. For example, a determination is made to verify whether a GPIO pin is configured to be logic high. An initialize process returns the device to a consistent state using the configuration state without resetting the hardware. This avoids inconsistencies where resetting an output pin can trigger incorrect ignition event timing. Finally, reset process escalates to resetting the hardware peripheral. In some embodiments, the controller may be implemented to only allow reset GPIO banks to be made up of multiple ports. Therefore, all previously set configuration for all ports is lost, causing re-initialization all associated drivers. This approach can be illustrated with the following example. The controller may implement a method to freeze the configuration of a GPIO bank which requires a reset to unlock its effects. If an attacker freezes the configuration of a bank after modifying an output to an input pin, the following operations may be performed to counter such an attack: the validation process will detect the incorrectly configured pin, which will escalate to the initialization process. The initialization process will then attempt to write the correct configuration to the bank, but fail because it is frozen. Finally, the reset process will issue a hardware reset of the bank.

Next, consider a scenario involving a cached event state. From the perspective of an attacker, cached state can be used to feed malicious inputs to other parts of the system. An RSR/YOLO-based implementations handle a cached event state as a non-authoritative, disposable state. Depending on the cached event in question, other micro-reset layers can invalidate this state as necessary. If the cached data is invalidated, the sensor is simply polled again. Making this state non-authoritative limits the effects an attacker's corruption of these values could have.

Lastly, consider the multi-period state, in which state estimation usually occurs through several consecutive observations of input data potentially across multiple periods. An attacker can exploit the time it takes to observe these events to force the ECU's engine position decoder (for example) to believe it is synchronized for an indeterminate amount of time. By allowing the ECU to believe it is synchronized, ignition and injection events can be incorrectly scheduled which may cause physical harm to the engine. Two example approaches can be taken to ameliorate these attacks. One approach involves replication similar to those used by other fault tolerant techniques that exploit the idea of consensus between untrusted observers. Typically, such systems use consensus testing among multiple observers in a distributed system to overcome some number of untrusted actors. In this case, the goal is not to come to a consensus on the individual messages, but on the state of the system given a time series of messages. Each message can be considered as potentially being compromised, and therefore test the consensus of the observers across a sliding window of received messages, discarding the old input as soon as it is feasible. This limits the lifespan of a compromised message to the duration of the minimum sequence of messages necessary to make an estimation. The number of replicated observer instantiations depends on the state being observed. This approach is mainly appropriate when state estimators, which requires multiple messages over time, are implemented in an object oriented manner, and a reset of that estimator is implemented as often as possible without violating the encapsulation of that estimator. This strategy allows to define a reset for that object without a performance penalty.

Thus, in some embodiments, the cyber-physical system may further include one or more sensors of the cyber-physical system to obtain measurements indicative of a state of at least one component of the cyber-physical system, and the at least one controller may further be configured to determine respective estimates of the state corresponding to the one or more components of the cyber-physical system based on the measurements from the one or more sensors. In such embodiments, the at least one controller configured to cause the at least one reset may be configured to reset the at least one controller in response to a determination of a discrepancy between two or more estimates of the state corresponding to the one or more components determined from the respective measurements. In some embodiments, the one or more sensors configured to obtain the measurements are configured to obtain measurements from multiple engine position decoders indicative of an engine state of an engine.

A second approach for controlled reset for multi-period states involves explicitly regenerating any state that does not require observations from the outside world to be reconstructed. One example would be continual re-computation of task schedules such as ignition and injection events (i.e., when the cyber-physical system is an engine). Specifically, for engine position events which regularly schedule these tasks, existing task schedules can periodically be discard, and new ones re-computed in their place. This approach is also referred to as a rejuvenation approach. By following this approach, an attacker is prevented/inhibited from compromising the controller by inserting its own task into an existing schedule.

As discusses herein, another strategy to inhibit malicious attacks on a cyber-physical system is the diversification approach. A goal of an RSR-based implementations is to increase the confidence that the cyber-physical system is functioning as designed the majority of the time. As noted, a first approach to thwart malicious attacks is the use of recurring micro-resets (e.g., micro-reboots) actions that return the system to a well-modeled state. This opens a vulnerability window in which an attacker can exploit the system between micro-resets. Diversification lowers the likelihood that an attacker can successfully exploit the system between resets. Paired with resetability, highlights the tradeoff between the integrity and performance of the system. Further with diversification, RSR/YOLO can perform these micro-reset actions less often, reducing the performance penalties associated with them. The RSR paradigm is agnostic to the diversification technique. The additional delays imposed by these techniques should not affect the real-time deadlines of the cyber-physical systems. These overheads vary from strategy to strategy, but are usually the result of encryption/decryption, random number generators, and additional read/writes required for their implementations. By leveraging the security that diversification provides while the program is running, the performance tradeoffs can be studied by varying system uptime and reset frequency. RSR-based approach can mitigate the impact of diversification by performing computation tasks as background jobs. However, the complexity incurred by delegating diversification tasks to background jobs is unnecessary because typical delays imposed are significantly smaller when compared to the real-time deadlines of the physical subsystem.

Embedded platforms typically found in cyber-physical systems have limited resources. These constraints can restrict the choice of diversification methods to those which can be implemented efficiently on embedded devices. Performance is not the only restriction, the diversification strategies must also provide protection against memory vulnerabilities. Among the various strategies available, consider the following subset of strategies: $LR^2$, Isomeron, and Instruction Set Randomization (ISR). Each approach has various levels of runtime cost, as will be more particularly discussed below.

The first example diversification approach considered is Leakage-Resilient Layout Randomization, or $LR^2$, which enforces execute-only-memory (XoM) in software. It makes use of hardware that can enforce (W⊕X) which is commonly provided by either an MPU or MMU. $LR^2$ divides the memory address space into two regions: code and data. It uses this division and load masking to enforce the property that load operations cannot access code pages, limiting the attackers' ability to create ROP gadget chains.

In a second diversification approach, Isomeron introduces a hybrid defense approach that combines code randomization with execution path randomization. The main security objective of Isomeron is to mitigate code-reuse attacks. The high level idea is the following: two copies of the program code are loaded into the same address space and execution is randomly transferred between the two on every function call. One copy of the program, A is the original application code, while the other, B, is diversified using any fine-grained address space layout randomization (ASLR) process. This ensures that gadgets across both versions are at different addresses. Thus, since the attacker cannot predict when either A or B will be executed, the attacker cannot construct a correct gadget chain. One implementation of Isomeron uses dynamic binary instrumentation techniques. This approach is not feasible on resource constrained devices, and hence Isomeron can be implemented using static techniques. Leveraging existing BinUtils functionality and a custom binary rewriting tool, the implementations described herein make it suitable for resource constrained devices.

There are three major components to implementing isomeron: program twinning, execution randomization, and function call instrumentation. Program twinning is done in three steps: cloning, patching, and linking. For cloning, the implementation first begins by separating out code from data using the appropriate compiler flags such as -ffunction-sections and -fdata-sections. Then, using the binary rewriter, the data relocation information of version B is patched to point to A. Finally, the linker stitches things up to create the final ELF file. Execution randomization is performed using a source of randomness, for example, a hardware random number generator (RNG). The values from the RNG are stored into a protected memory region and used to perform execution randomization at the granularity of a function call. The final component involves instrumenting function calls to allow for randomized execution paths. This step is performed using linker flags such as -wrap and shadow stacks, in order to encapsulate function entry and exit with function trampolines.

In a third diversification approach, $LR^2$ can be used to strengthen and improve Isomeron's performance, and Isomeron can be used for adding extra security benefits to $LR^2$. A hybrid approach is therefore implemented that leverages the features of both schemes. Using $LR^2$ to provide the foundation in order to handle memory protection mechanisms and Isomeron's execution path randomization to increase the entropy of the program, resulting in a diversification strategy with better performance than Isomeron alone.

In a fourth diversification approach, Instruction Set Randomization is implemented. Instruction Set Randomization (ISR) is a technique that mitigates attacks by encoding instructions. A simple way to accomplish this is to XOR every word in text pages offline with a unique key and use the same key again online to decode them just before execution. An embodiment of the ISR method uses an MPU to perform Just-In-Time decryption of the instruction stream. On an STM32F4 platform, discussed in greater detail below, the MPU provided includes eight (8) regions. Four of them are used to protect flash and SRAM and also to enforce W⊕X. The remaining four regions are used to set a work memory area for ISR on SRAM.

Each MPU region is set to cover, in some embodiments, 1 KB. There are eight sub-regions for each MPU region allowing text pages to be decoded in 128 B units. In general, the unit size is an implementation parameter and should be tuned for specific applications. Overlay and function wrapping features provided in GNU toolchains are used to create an executable image with ISR. The overlay feature sets the effective address of each function to the work memory area and the wrapping feature inserts a trampoline before each function. In the trampoline function, an overlay manager is implemented that modifies the MPU.

In the embodiments described herein, two versions of ISR have been realized and tested. In the first version each overlay section contains only one function, whereas in the second version each section contains multiple functions. An overlaid function is executed in the following manner. All the access to the work memory is disabled on boot. A call to an overlaid function starts with a call to a trampoline. The trampoline first pushes the return address and currently mapped function load address to a special stack associated with each thread. Then, the currently mapped load address and the load address of the function to be called are compared. If they do not match, all the MPU regions for the work memory are disabled. After that, the trampoline calls the target function.

As the function goes on to execute and accesses an encrypted region, a memory access fault exception is raised. In the exception handler, the corresponding 128 B block is activated and decoded into the work memory. Since the work memory has to be reset between every function call, this makes this approach expensive. To mitigate this, a second optimized version of ISR that puts multiple functions into one overlay based on the execution profile of the first version was conceived. From execution of the first version, the history of functions decoded into the work memory is collected, which allows to group together those functions with the highest number of occurrences. From this history, a weighted graph is created.

Figure 3:
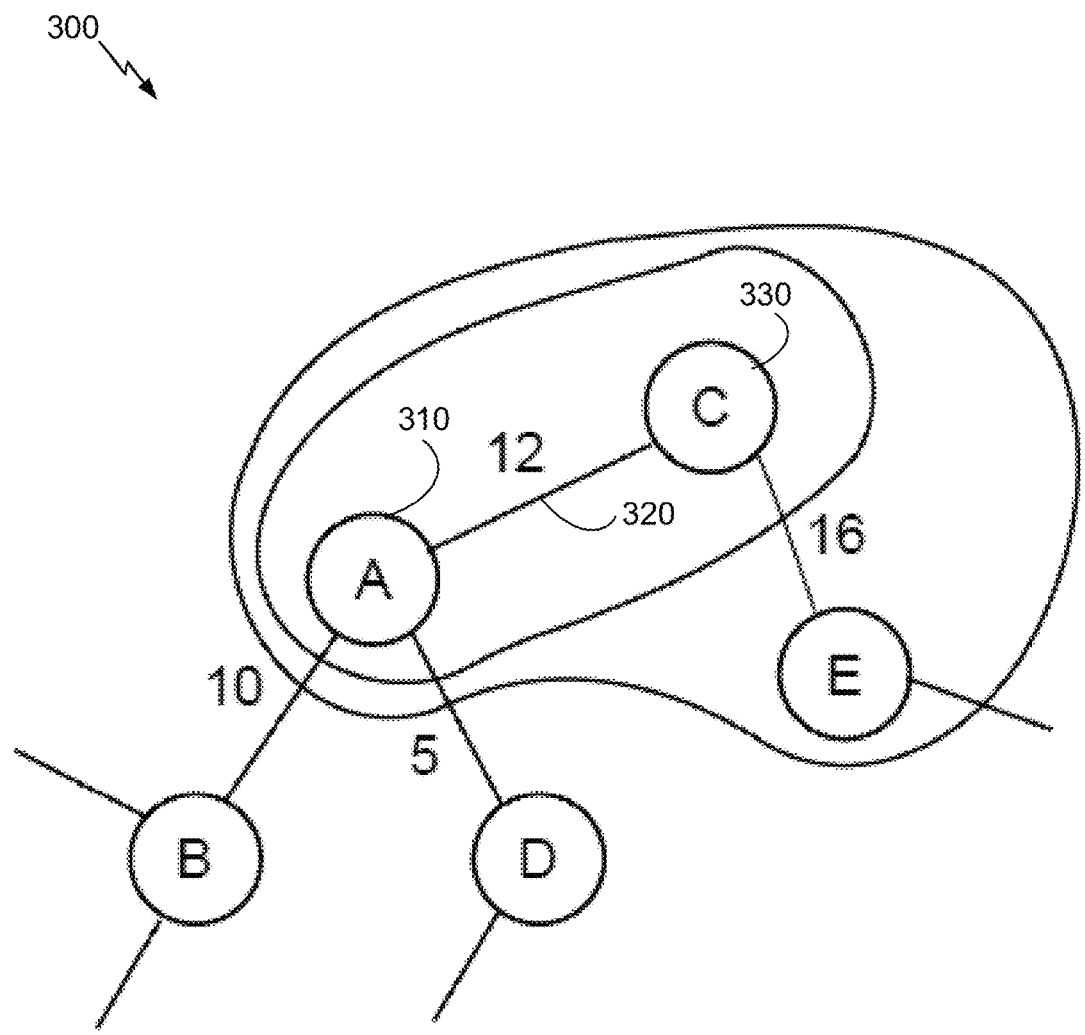
FIG. 3 is an example of a work memory transition graph.

An example of a work memory transition graph 300 is shown in FIG. 3. Each node in the graph represents a decoded function and each edge represents how many times the connected nodes appear together. Consider picking node A (marked as node 310), which has the highest occurrence in the graph. An edge, connected to Node A, with the largest weight can then be picked, which in the example of FIG. 3 is edge 320 between node A (the node 310) and node C (node 330). A check is made whether these two functions fit within the work memory, and if so put them in the same group. After that, an edge with the largest weight is picked from this group, and this continues until all edges are considered. If there is any node that is not part of any group, the one with the highest occurrence is picked, and the same process is repeated.

Figure 4:
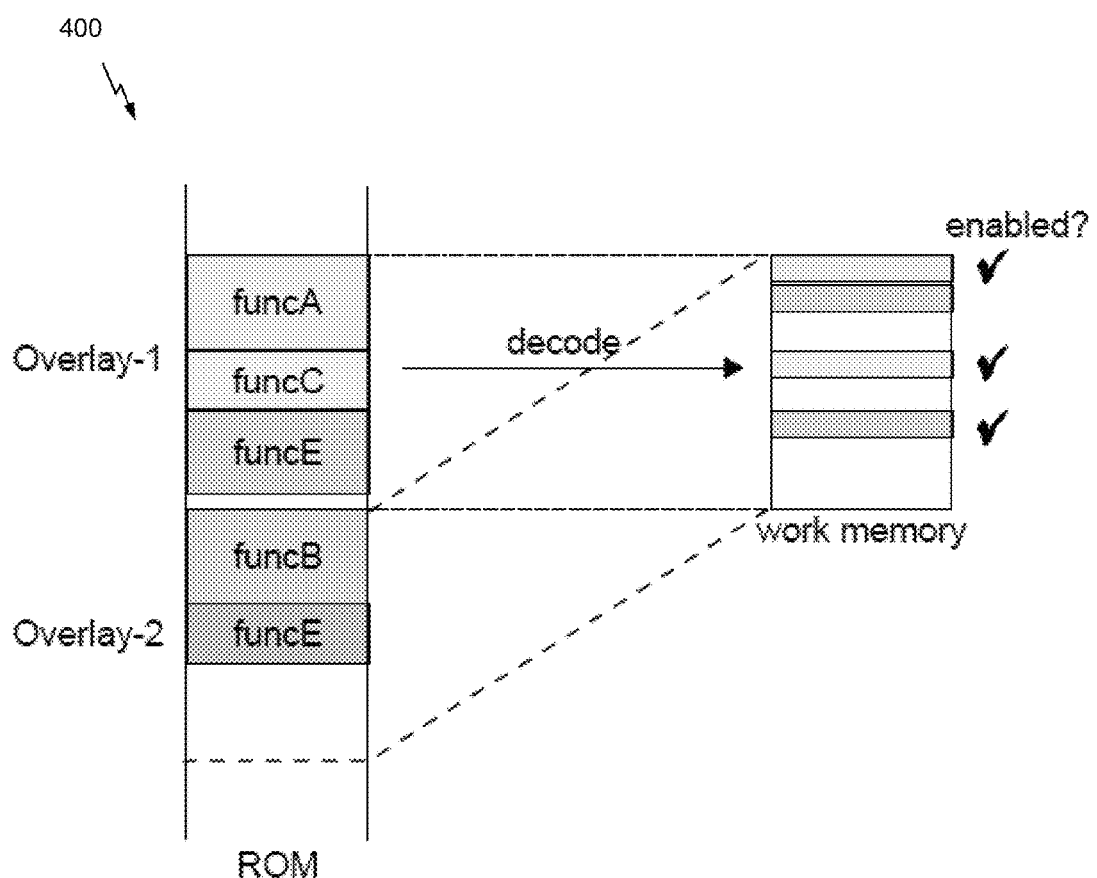
FIG. 4 is a diagram illustrating instruction set randomization (ISR) with multiple functions in one overlay section.

With the optimized implementation of ISR, 128 B blocks in the work memory can contain decoded texts from different overlays, as illustrated in FIG. 4 (which includes a diagram 400 illustrating ISR with multiple functions in one overlay section). These blocks are held in the work memory like a cache entry, but any access to them is forbidden by the MPU until that overlay section is mapped again. When that region is enabled/activated again, the cached decoded text is re-used.

Figure 5:
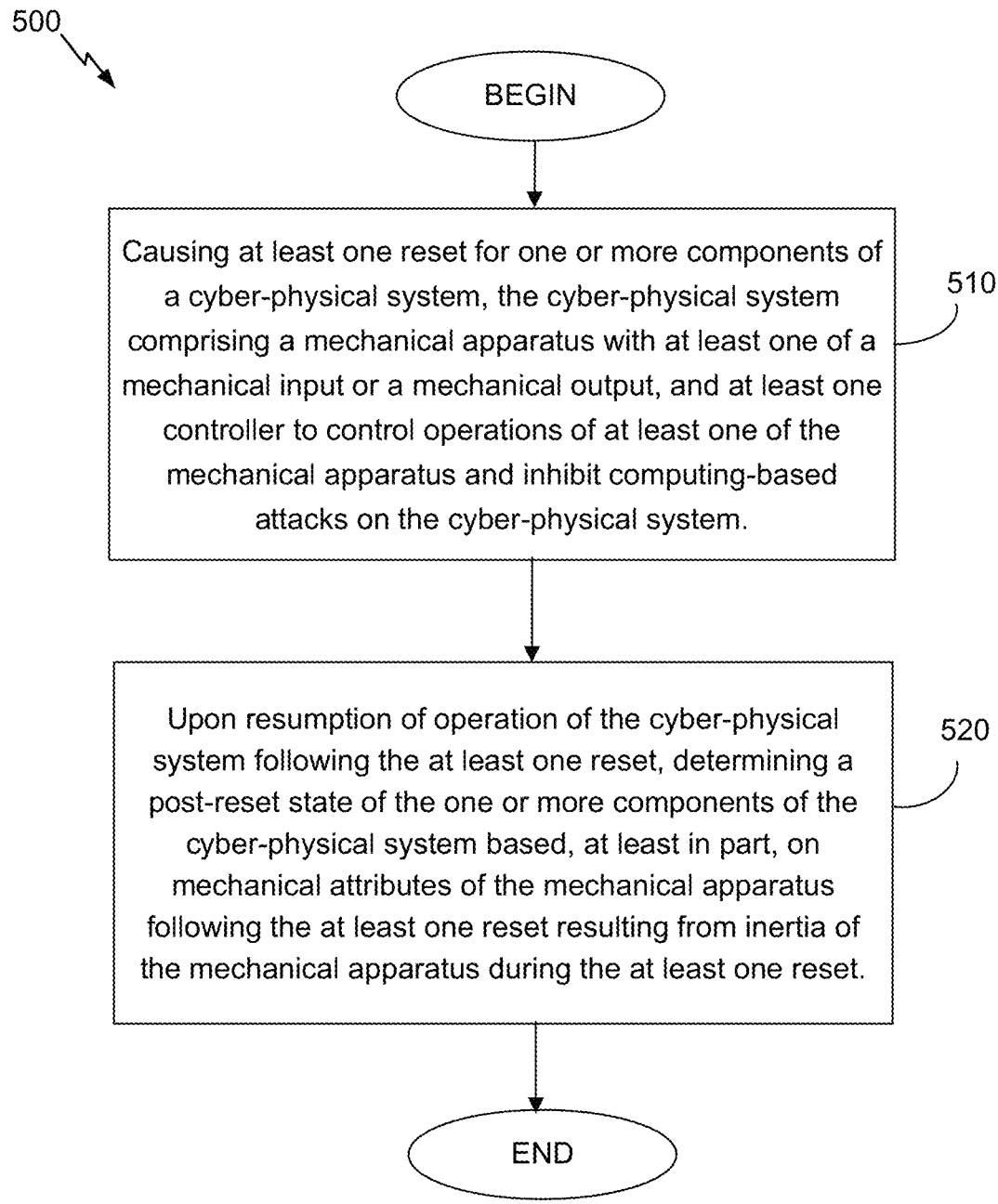
FIG. 5 is a flowchart of an example procedure to control a cyber-physical system and inhibit computing-based attacks.

With reference next to FIG. 5, a flowchart of an example procedure 500 to control a cyber-physical system (such as the system 100 illustrated in FIG. 1) and inhibit computing-based attacks, is shown. The procedure 500 includes causing 510 at least one reset for one or more components (e.g. a controller, sensors, task scheduler, and other components such as those depicted in FIGS. 1 and 2) of a cyber-physical system. The cyber-physical system includes a mechanical apparatus with at least one of a mechanical input or a mechanical output, and at least one controller to control operations of at least one of the mechanical apparatus and inhibit computing-based attacks on the cyber-physical system. In some embodiments, the controller may be part of the mechanical apparatus (e.g., as in the case of an engine-control unit, or ECU, integrated into an engine). The controller may be a processor-based device, an ASIC, a state-machine, or some other type of controller.

In some embodiments, causing the at least one reset (of the one or more components, which may include, the controller, sensors, etc.) may include causing recurring resets (at regular or irregular intervals) for the cyber-physical system. For example, the reset (or re-boot) may occur at pre-determined intervals, or may occur upon a determination of that conditions warrant a re-boot (e.g., if there is an enhanced risk or likelihood that a malicious attack is in progress). In some embodiments, the recurring reset intervals may be adaptively regulated based, for example, on environmental conditions, and/or changes to it, affecting the cyber-physical system.

In some embodiments, the method may further include obtaining measurements from one or more sensors of the cyber-physical system (e.g., engine sensors) indicative of a state of the one or more components of the cyber-physical system, determining respective estimates corresponding to the state of the one or more components of the cyber-physical system based on the measurements from the one or more sensors, and resetting (e.g., re-booting, restoring a state snapshot, etc.) the at least one controller in response to a determination of a discrepancy between two or more estimates corresponding to the state of the one or more components determined from the respective measurements. For example, obtaining the measurements from the one or more sensors may include obtaining measurements from multiple engine position decoders indicative of an engine state of an engine. In some variations, the system reset may be a full reset (e.g., a complete re-boot) or a partial reset (e.g., only some units or components of the cyber-physical system are reset).

As noted, the resets may include such techniques as rebooting, at least in part, the affected components of the CPS, restoring a previously saved stated for the those effected components (i.e., taking a state snapshot at some earlier point of time, e.g., immediately after initialization of the CPS, and recurringly restoring that state snapshot). Thus, in such embodiments, causing the at least one reset for one or more components of the cyber-physical system comprises one or more of, for example, re-booting, at least in part, the one or more components of the cyber-physical system, restoring a previously saved state for the one or more components of the cyber-physical system, etc.

With continued reference to FIG. 5, the procedure 500 further includes determining 520, upon resumption of operation of the cyber-physical system following the at least one reset, a post-reset state of the one or more components of the cyber-physical system based, at least in part, on mechanical attributes of the mechanical apparatus following the at least one reset resulting from inertia of the mechanical apparatus during the at least one reset. Determining the post-reset state of the one or more components may include determining the post-reset state of the one or more components based further on one or more previous inputs received by the cyber-physical system prior to a beginning of the at least one reset.

As noted, another strategy to counteract the threat of malicious cyber-attacks on the cyber-physical system includes the use of process variants to control cyber-physical system. Thus, in some embodiments, the procedure 500 may further include selecting one of multiple available process variants for at least one process implemented by the cyber-physical system. Selecting the one of the multiple available process variants may include providing the multiple available process variants according to one or more of, for example: leakage-resilient layout randomization techniques, Isomeron techniques, instruction set randomization techniques, or any combination thereof. Other diversification techniques to alter a process (e.g., its code or data) so that various instances of the process provide substantially the same (or even identical) functionality while operating differently at the binary level, may also be used.

In some situations, the procedure 500 may further include terminating use of the selected one of the multiple available process variants for the at least one process upon a next reset of the cyber-physical system. In such embodiments, the procedure may further include selecting another of the multiple available process variants for the at least one process for execution by the at least one controller upon the resumption of the operation of the cyber-physical system following the next reset.

In some implementations, the procedure 500 may further include periodically re-computing state data for the one or more components of the cyber-physical system. In embodiments in which the at least one component is an engine, periodically re-computing data for the one or more components may include periodically re-computing a task schedule for the engine, with the task schedule comprising control signals to control one or more of, for example, an engine ignition task and/or an engine injection task.

Figure 6:
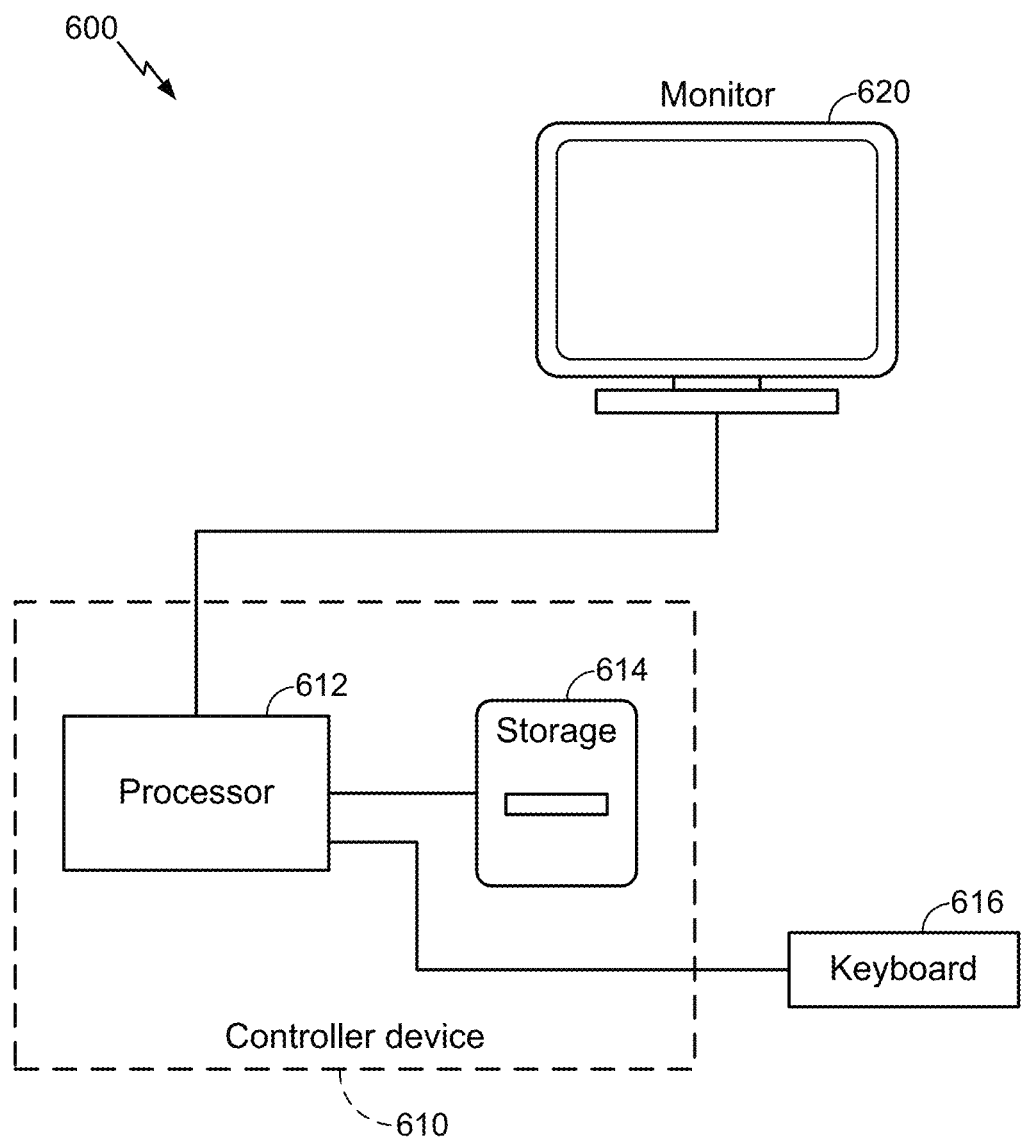
FIG. 6 is a schematic diagram of a generic computing system.

Performing the various operations described herein may be facilitated by a controller system (e.g., a processor-based controller system, a state machine, etc.) Particularly, at least some of the various devices/systems described herein may be implemented, at least in part, using one or more controllers such as the one shown in FIG. 6, illustrating a generic computing or controller system 600. The computing system 600 includes a computing-based device 610 such as a personal computer, a specialized computing device, a controller circuit (implemented on a chip), and so forth, that typically includes a central controller 612 (which may a programmable processor, such as a CPU). In addition to the central controller 612, the system includes main memory, cache memory and bus interface circuits (not shown in FIG. 6). The computing-based device 610 may include a mass storage element 614, such as a hard drive or flash drive associated with the computer system. The computing system 600 may further include a keyboard 616, or keypad, or some other user input interface, and a monitor 620, e.g., an LCD (liquid crystal display) monitor, that may be placed where a user can access them. The computing system 600 may be incorporated within a system such as the cyber-physical systems described herein.

The computing-based device 610 is configured to facilitate, for example, the implementation of operations to protect against, and counter attacks against cyber-physical systems (e.g., by causing/triggering recurring re-boots of the cyber-physical system, and/or selecting process variants of the processes used to control the cyber-physical system). The storage device 614 may thus include a computer program product that when executed on the computing-based device 610 causes the computing-based device to perform operations to facilitate the implementation of procedures and operations described herein. The computing-based device may further include peripheral devices to enable input/output functionality. Such peripheral devices may include, for example, a CD-ROM drive and/or flash drive (e.g., a removable flash drive), or a network connection (e.g., implemented using a USB port and/or a wireless transceiver), for downloading related content to the connected system. Such peripheral devices may also be used for downloading software containing computer instructions to allow general operation of the respective system/device. Alternatively and/or additionally, in some embodiments, special purpose logic circuitry, e.g., an FPGA (field programmable gate array), an ASIC (application-specific integrated circuit), a DSP processor, etc., may be used in the implementation of the system 600. Other modules that may be included with the computing-based device 610 are speakers, a sound card, a pointing device, e.g., a mouse or a trackball, by which the user can provide input to the computing system 600. The computing-based device 610 may include an operating system, e.g., Windows XP® Microsoft Corporation operating system, Ubuntu operating system, etc.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

In some embodiments, any suitable computer readable media can be used for storing instructions for performing the processes/operations/procedures described herein. For example, in some embodiments computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only Memory (EEPROM), etc.), any suitable media that is not fleeting or not devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

To demonstrate the efficacy of the RSR paradigm described herein, several studies were performed in which RSR implementations were used, in a first case study, with an engine control unit (to control a car engine), and, in a second case study, with a flight controller (to control an aircraft). Thus, in the first case study, an RSR implementation was used with a rusEFI open-source ECU and a Honda CBR600RR engine (a commonly hacked engine used by enthusiasts) was investigated. The rusEFI's main responsibilities include controlling fuel injectors, ignition, fuel pumps, and the valves. The source-code is written in C/C++ running on top of an open-source Real-Time OS (RTOS) called ChibiOS and is executed on a STM32F4-Discovery Board. This board contains a 168 MHz ARM Cortex-M4 processor with 192 Kbytes of SRAM and 1 MB of ash. As is typical for these devices, the instruction fetching path is optimized for ash. Flash instructions issued from the SRAM suffer a 50% performance penalty. The Honda CBR600RR engine weighs around 130 lbs and involves the rotation of various shafts along the engine. The inertia inherent in these rotations is crucial to implementation of RSR/YOLO. In fact, certain shifting methods such as power-shifting, take advantage of this property. Power-shifting involves cutting the injection and ignition, effectively allowing the engine to rotate freely as shifting completes.

The case study involving the above-specified hardware sought to analyze the performance penalty resulting from re-booting and diversification processes applied to the CBR600RR engine. Resetting the ECU has the effect of cutting power temporarily for the time taken to reinitialize the controller. To emulate this behavior, a commercial closed source MOTEC M84 ECU1 was configured to cut out its output to the engine over a range of engine speeds (or frequencies) and durations using the power-shifting mode to disable injection events for fixed intervals. Using a commercial ECU allows analyzing performance against a robust implementation which is widely used, expertly tuned implementation on this specific engine. The results were compared to the performance penalties realized by resetting strategies. To analyze the effect of diversification, the diversification strategies were implemented on the opens-source rusEFI ECU, and the engine functioning was then emulated to measure, at specific speeds, the amounts by which scheduled deadlines were missed, and the amount of CPU idle time. These results were then compared with the undiversified version to measure the cost of the diversification.

In the experimentations and evaluations conducted for the implementations described herein, the latency of resets on the RusEFI implementation, and the performance costs of resetting on the MoTEC ECU, were evaluated to understand the best case performance for resetting. There are generally two sources of reset overheads. The first is simply the cost of resetting the chip and reinitializing the controller. The second cost is the number of engine cycles taken to measure certain state properties, such as engine speed, that must be measured over multiple engine periods. If each engine period takes a millisecond, then completing these tasks will take multiple milliseconds, thus limiting the maximum reset frequency. The baseline implementation of rusEFI requires 40 ms to restart. The startup routine was optimized by removing trivial functionality like logging, to create a 20 ms reset. While further optimization may be possible, it may compromise basic security features like wiping the stack region between resets. The second reset cost, namely, the cost of multi-period measurements, is driven by two main stateful components: a) the code to estimate when the trigger is decoded, and b) the code that estimates the speed of the engine. Both of these require a full rotation of the engine to warm up their physical state estimation routines. Assuming a nominal engine speed of 4500 RPM (i.e., approximately 75 Hz), each engine cycle takes 13 ms. The state estimation tasks related to RSR-based implementations take another 26 ms (two cycles for estimation). Thus, an expected reset latency would be 46 ms. In this time roughly three engine revolutions (for a 4500 RPM) can be completed.

The experimentations and evaluations of the RSR implementations described herein were also used to determine the cost of resetting as measured by the drop in engine speed, and how it varies relative to how often the engine is reset and the length of each reset. Running the Honda CBR600RR engine on a test bench, the engine's rotational speed for different duration and frequencies of ECU resets was measured. The measurement results showed that if the duration ($d_R$) and frequency of the reset is low (20 ms at 1 Hz) then there was no observable loss in engine speed. As the reset duration increases, there are more noticeable changes in engine speed.

In addition to engine speed, another metric of interest is the engine's rotational kinetic energy. Under normal operation at a constant engine speed, the engine controller maintains the average amount of energy in the system at a relatively constant level. The degradation in the performance of the ECU as the loss of that average energy can be measured and be compared to the nominal level. As the frequency of resets is increased, at some point the ECU is not able to generate enough energy to overcome friction, and the engine comes to a stop after a number of revolutions, which is considered to be a failure of the engine. The engine speed at which this failure occurs is referred to as the stalling threshold.

Figure 7:
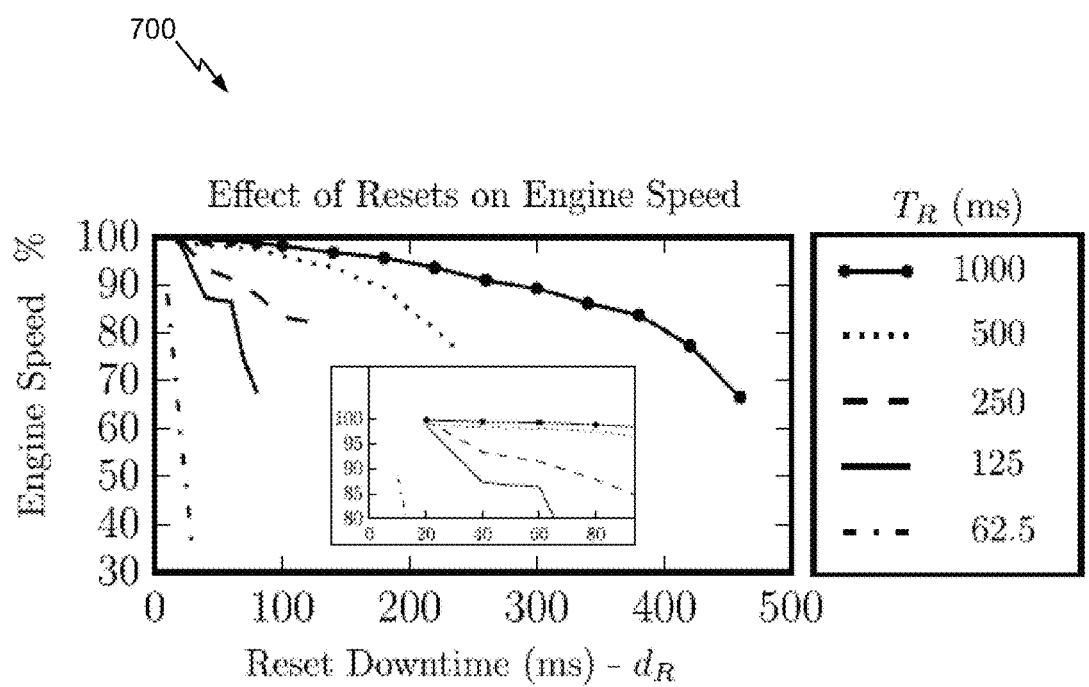
FIG. 7 is a graph showing the effect of modifying reboot frequency and duration on an engine's speed (or energy).

In order to validate the safety of the system, two safety requirements were defined, namely: (1) the engine should maintain its speed (e.g., 4500 RPM or 75 Hz), and (2) there should be no engine knock (a misfiring of the ignition that causes pockets of air-fuel mixture outside of the normal combustion cycle) or pre-ignition. A set of experiments on the tested engine to explore the costs of resets as measured by the drop in engine speed, and how it varies with different reset periods ($T_R$) and reset downtimes ($d_R$), were performed. To determine the satisfiability of the first requirement, a sweep of $d_R$ and $T_R$ were performed given an engine speed of 4500 RPM. FIG. 7 is a graph 700 showing the change in engine speed as a percentage for the sweep. Each line in the graph represents a different reset interval $T_R$. FIG. 7 includes plots for 1 s, 500 ms, 250 ms, 125 ms, and 62.5 ms resets. From FIG. 7 it can be seen that the first safety requirement, maintaining the engine speed, can be satisfied for a wide range of $d_R$ and $T_R$ where the engine speed is approximately 100%. To see what happens when the engine speed drops significantly, the ratio D is defined for the time the engine spends igniting and injecting fuel and the time it spends resetting. As illustrated in FIG. 7, as the ratio D decreases for a fixed $T_R$, the engine speed decreases. At some point, depending on the ratio D, the ECU is not able to generate enough energy to overcome friction, and the engine comes to a stop (i.e., the stop or stalling threshold). As the reset (e.g., reboot for the ECU) occurs more frequently, lower engine speeds can be used without crossing the stopping threshold during operation. It is also noted that the actual stalling threshold varies non-linearly with $T_R$ and $d_R$, most likely due to environmental factors and the large variability in the internal combustion process. To validate the second requirement, the same ignition and injection delay sweep were added as this increases the chance of knocking. No audible feedback was observed, thus satisfying the second safety requirement. From the above experiments, it can therefore be concluded that there are specific combinations of reset periods and reset downtimes for which safety can be satisfied even as the system misses events.

The evaluation results discussed above indicate that micro-reset techniques can be used effectively at the granularity of multiple revolutions. To reduce vulnerabilities between resets, diversification techniques can be used. Diversification when used in conjunction with resetting allows an RSR system to limit the attacker from consistently exploiting the system in a predictable manner. Accordingly, the RSR-implementations described herein were also evaluated to determine their performances, and performance costs. The objective of the experimentations and evaluations performed for the implementations described herein was to determine the limits/applicability of different types of diversification strategies in the context of a YOLO-ized ECU system. Specifically, answers to the following questions are sought: 1) can diversification be accomplished without harming the operation of the cyber-physical system? (In other words can diversification result in missed deadlines?), and 2) if deadlines are missed how does it impact the overall operation of the system?

Firstly, an evaluation is provided of some of the various diversification techniques described herein, with respect to the effects that their performance penalties have on model real-time systems (e.g., the rusEFI ECU). Simulated inputs were applied to the ECU at a range of engine speed inputs. This allowed the overhead of each strategy to be evaluated by comparing the overall computational overhead of the change in latency of hard real-time events as compared to the baseline implementation. To measure the overall computational overhead, the amount of time that the processor spent idling was compared by examining the cycle counter every time the program entered and left the idle loop. The evaluation showed that $LR^2$'s performance was found to be on par with the baseline rusEFI primarily due to its efficient load-masking technique. At the other end, it was determined that both ISR implementations deviated from the baseline. The high overhead was mainly due to the constant copying and decoding of code sections into the work memory, as well as the overhead of issuing instructions from SRAM. The interesting results were with respect to the Isomeron and Isomeron+$LR^2$ techniques. The difference in idle time between the two stems from the implementation with respect to code pointer hiding. For Isomeron, a shadow stack is used, while when paired with $LR^2$ the original stack is used along with XOR encryption resulting in less writes to memory. While different strategies affect the idle time, the context switches to the idle thread remain unchanged because they are not causing processing of events to overlap with each other.

Next, the issue of real-time delays was considered. In a cyber-physical system, real-time events such as sensor inputs are scheduled by configuring a real-time timer to trigger an event handler when it expires. There is some overhead in processing each real time scheduled event due to the scheduler and whatever processing the handler does to calculate the appropriate output for the scheduled event. This overhead can be predicted, and should be negligible on the time scale of the expected precision of the cyber-physical system. As long as the additional overhead imposed by the diversification method is on the order of these inherent overheads, it can also be considered negligible with respect to the expected behavior of the CPS. From the perspective of the ECU, the overhead causes errors in the coordination of the event with respect to the physical system. This error may be measured either in terms of time or in terms of the expected angle of the crank shaft. The average overhead for events in the baseline implementation is 80 microseconds, which corresponds to 2.16° at the nominal 75 Hz engine speed. The results obtained showed that for $LR^2$, the computational delay overhead is the lowest at around 13% percent above baseline, corresponding to 2.441°. The hybrid $LR^2$+Isomeron have an approximate overhead of 213% (4.601°), while plain Isomeron is 392% (8.467°). Finally, the worst performer is the un-optimized ISR, at around 1476% (31.88°). To put these numbers in context, in commercial systems such as the MoTeC ECU, the real-time events are usually accurate to within 2-3°. Except for the un-optimized ISR, most of the diversification strategies fall within the acceptable deviations.

To summarize, what was found was that the hard real-time deadlines of the ECU can be met despite the increased overhead. While the delay overhead may seem large, due to the time scale at which the physical events occur, the better performing strategies actually have minimal overhead.

Turning now to the second case study, the use of an RSR (YOLO) system with a flight controller was tested and evaluated. The flight controller is the brain of an aircraft and is designed to ensure its stability and control. An aircraft has six degrees of freedom: translation along the x, y, z directions and rotation about the x, y, z axes. Each rotational axis is commonly referred to as pitch, roll, yaw, respectively, while the three together are referred to as the attitude. Proper attitude control of the aircraft is critical for its stability. The flight controller is primarily responsible for ensuring attitude stability while aiding a pilot or performing autonomous flight. It must read all of the sensor data and filter the noise in order to calculate proper output commands to send to its actuators. In the flight control case study, quadrotor helicopters (more commonly referred to as quadcopters) were considered. Controlling these quadcopters involves operating four independent rotors to provide six degrees of freedom. Sensors measuring a number of physical properties are then processed (fused) to estimate the position and attitude of the quadcopter. This estimation, similar to the case of ECU, requires a certain number of observation samples before an output is produced. This output is then used by other components that determine the best command actions for the system.

In the flight control case study, a PX4 open-source flight controller with a DJI F450 quadcopter air-frame (a common DIY kit favored by enthusiasts) was used. The PX4 flight controller provides attitude and position control using a series of sensors such as GPS, optical flow, accelerometer, gyroscope, and barometer. The PX4 controller software includes a variety of flight modes ranging from manual, assisted, to fully autonomous. The source-code is written in C/C++ and supports multiple kinds of OS and hardware targets. A Pixhawk board based on a series of MCU was used. The overall PX4 architecture used two main estimators corresponding to the six degrees of freedom: position estimator and attitude estimator. The estimated values were passed to the position controller and attitude controller which were then used to compute the optimal trajectory and trust vectors for the quadcopter. The thrust vectors were then converted from their normalized state to their raw (PWM—pulse-width modulation) values by a mixer and the result is directly supplied to the actuators. Depending on the flight mode, certain components function differently. For assisted mode, pilot inputs are fed directly autonomous mode the system is controlled by a navigator which feeds coordinates to the position control.

The first reset strategy tested for the flight controller study was one of reboots. The downtime $d_R$ for PX4 was found to be around 1.5 s. This higher reset time in comparison to the ECU was not unexpected due to the higher complexity of the quadcopter controller. Given the more sensitive physical dynamics of the quadcopter, simple rebooting was not effective, i.e., the quadcopter would crash very often, prompting the need of a more efficient approach. This led to an alternate reset strategy. It was found that much of the startup time was spent in initializing data structures and setting up the system for operation. Thus, a snapshot was created right after initialization that was used to practically instantly start the system. This provided certain security benefits as the snapshot can be verified and signed, limiting, or even completely eliminating the possibility of tampering from an attack.

Under the snapshot-based reset strategy, a snapshot of the entirety of RAM of the controller is taken. It is then stored in a special region of flash memory and at the following boot, the saved state is restored. The special flash region is protected, and locked by the MPU. This provides a consistent restoration point for the system's lifetime. This reset strategy was implemented as an extension of the NuttX library operating system used by the Pixhawk PX4 target. The reset from the snapshot takes approximately 3 ms and is primarily dominated by the time required to write data from flash to RAM.

The time consideration of when to take the snapshot, and what data to store for the snapshot, have implications on the capabilities of the system. Depending on the flight mode for the quadcopter, the snapshot has different requirements as to what data can be reset and persisted. For the autonomous flight mode for example, coordinates for the quadcopter's flight path could appropriately be made can be part of the snapshot taking care to use absolute values were possible. However, including the flight path in the snapshot would prevent the quadcopter's path from being modified midflight. If this capability is desired, the data would need to be persisted across resets and protected in some way. The assisted flight mode has fewer limitations. For the assisted flight mode, which only requires the pilot inputs, a simple snapshot of the system, taken after the sensors have been calibrated, may be sufficient, as the system can recover the state that it needs by re-observing the environment. For optimal security, the snapshot could be taken once in a controlled and secure environment, as long as, the system was initialized with the correct parameters.

As for the diversification strategy to be used, here too an alternate diversification approach, based on a simple variation of conventional stack canaries, was implemented. Upon each reset, new canaries were randomly generated for use by the control processes. This functionality is provided with minimal modifications to LLVM's Stack Protector.

The performance for the above reset and diversification approaches used for the flight controller CPS were evaluated. Two safety requirements were defined for the evaluation: (1) The quadcopter should not oscillate during flight (in other words, its attitude should be stable), and (2) The quadcopter must not crash and fall out of the sky. These two requirements are critical to the safety of the quadcopter as oscillations limit the control and stability of the system, especially when attempting to hover. Additionally, if the quadcopter falls out of the sky, then it could cause irreparable damage to itself and others.

To better gauge the threshold at which a pilot would begin to detect these oscillations, or in other words, the lower limit for the reset interval, $T_R$, a survey among a set of 20 students. The survey was conducted using an ABX test methodology where various videos of the quadcopter with RSR during flight for different $T_R$ were shown. Before conducting the survey, users were shown an example video of a stable and unstable flight. They were then shown videos in a random sequence and asked to determine whether there were any observable oscillations during hover flight. The results indicated that oscillations became significantly observable somewhere between a $T_R$ of 0.5 to 1 second.

Next, the results of the poll were related to technical parameters of flight, specifically the attitude. Two Pixhawk flight controllers were mounted on the quadcopter: one for control and the other for data acquisition. To quantify the effects of reset, the standard deviation of the quadcopter's attitude rate over time from the flight data used in the polls was used. The results indicated little impact on the attitude for $T_R > 1$ s, and a large spike for smaller values. This indicates that for $T_R > 1$ s the stability of the system is roughly equivalent to the system without RSR. At lower $T_R$ periods, a large spike in the standard deviations can be observed, which corresponds to when the system is observed to start oscillating.

As noted, given the variety of external forces a quadcopter may be subject to, a reasonable strategy was to adaptively regulate $T_R$. The implementation of the adaptive mode was to vary $T_R$ between an upper and lower bound. At worst, if it is assumed that the wind is constant, the system will behave no worse than the upper bound $T_R$. In other words, this case will be equivalent to the recurring/periodic mode at the given $T_R$. In reality, since wind typically varies, due to gusts, the average effective $T_R$ of system should fall somewhere between the upper and lower bounds. To demonstrate this, wind was simulated using multiple fans blowing into the path of the quadcopter used in the tested implementation. The quadcopter was operated at $T_R = 1$ s for half of the time, and at $T_R = 8$ s for the other half. The results indicated that the adaptive mode's performance followed closer to the upper bound of $T_R = 8$ s.

In addition to the two case studies involving the ECU and the flight controller, the RSR-based implementations were also evaluated to determine their effect on the braking distance of a car if deployed on a brake controller. This investigation is important as it allows to validate the effects of RSR on systems where temporary loss of control may be viewed as unacceptable. Under ideal dry conditions, a car can usually achieve a deceleration of 8 m/s². RSR's resets ultimately increase the stopping time of the car, resulting in a slower deceleration rate. Two pairs of possible $T_R$ and $d_R$, RSR 1 and RSR 2, respectively. For RSR 1, a reset period ($T_R$) of one (1) second and a reset duration ($d_R$) of 100 ms were assumed. The effective deceleration in this case was roughly 9% slower or 7.27 (m/s2). For RSR 2, a $T_R$ of 125 ms and a $d_R$ of 20 ms (the same parameters as the ECU) were assumed, with an effective deceleration of roughly 13.8% slower or 6.96 (m/s²). Under normal highway driving conditions, the effects of RSR are marginal and in fact are less than the margin of variability seen among different cars. Given the variability seen among different cars, it is logical that drivers may naturally compensate for this difference in deceleration.

Accordingly, described herein is a new security paradigm, referred to as RSR, or YOLO, that leverages properties of cyber-physical systems, such as inertia and control process resilience, by combining diversification with micro-resetting processes. The RSR-based implementations described herein were demonstrated on an Engine Control Unit and a flight controller. The experimentations and evaluations conducted demonstrated that overheads required for the RSR-based implementations are tolerable for cyber-physical systems (such as an engine or an aircraft).

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Although particular embodiments have been disclosed herein in detail, this has been done by way of example for purposes of illustration only, and is not intended to be limiting with respect to the scope of the appended claims, which follow. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method comprising:
   causing at least one reset for one or more components of a cyber-physical system, the cyber-physical system comprising a mechanical apparatus with at least one of a mechanical input or a mechanical output, and at least one controller to control operations of at least one of the mechanical apparatus and inhibit computing-based attacks on the cyber-physical system; and
   upon resumption of operation of the cyber-physical system following the at least one reset, determining a post-reset state of the one or more components of the cyber-physical system based, at least in part, on mechanical attributes of the mechanical apparatus following the at least one reset resulting from inertia of the mechanical apparatus during the at least one reset.

2. The method of claim 1, wherein causing the at least one reset comprises:
causing recurring resets for the one or more components of the cyber-physical system.

3. The method of claim 1, wherein determining the post-reset state of the one or more components comprises:
determining the post-reset state of the one or more components based further on one or more previous inputs received by the cyber-physical system prior to a beginning of the at least one reset.

4. The method of claim 1, further comprising:
selecting one of multiple available process variants for at least one process implemented by the cyber-physical system.

5. The method of claim 4, wherein selecting the one of the multiple available process variants comprises:
providing the multiple available process variants according to one or more of: leakage-resilient layout randomization techniques, Isomeron techniques, instruction set randomization techniques, or any combination thereof.

6. The method of claim 4, further comprising:
terminating use of the selected one of the multiple available process variants for the at least one process upon a next reset of the cyber-physical system;
wherein the method further comprises:
selecting another of the multiple available process variants for the at least one process for execution by the at least one controller upon the resumption of the operation of the cyber-physical system following the next reset.

7. The method of claim 1, further comprising:
obtaining measurements from one or more sensors of the cyber-physical system indicative of a state of the one or more components of the cyber-physical system;
determining respective estimates of the state corresponding to the one or more components of the cyber-physical system based on the measurements from the one or more sensors; and
resetting the at least one controller in response to a determination of a discrepancy between two or more estimates of the state corresponding to the one or more components determined from the respective measurements.

8. The method of claim 7, wherein obtaining the measurements from the one or more sensors comprises:
obtaining measurements from multiple engine position decoders indicative of an engine state of an engine.

9. The method of claim 1, further comprising:
periodically re-computing state data for the one or more components of the cyber-physical system.

10. The method of claim 9, wherein periodically re-computing data for the one or more components comprises:
periodically re-computing a task schedule for an engine, the task schedule comprising control signals to control one or more of: an engine ignition task, or an engine injection task.

11. The method of claim 1, wherein causing the at least one reset for the one or more components of the cyber-physical system comprises one or more of:
re-booting, at least in part, the one or more components of the cyber-physical system; or
restoring a previously saved state for the one or more components of the cyber-physical system.

12. The method of claim 1, wherein causing the at least one reset for the one or more components of the cyber-physical system comprises:
adaptively regulating recurring reset intervals based, at least in part, on one or more of: environmental conditions affecting the cyber-physical system, changes to the environmental condition, location of the cyber-physical system, or a previous state of a previous reset.

13. A cyber-physical system comprising:
a mechanical apparatus configured for at least one of: receive one or more mechanical inputs, or provide one or more mechanical outputs; and
at least one controller to control operation of the mechanical apparatus and to inhibit computing-based attacks on the cyber-physical system, wherein the at least one controller is configured to:
cause at least one reset for one or more components of the cyber-physical system; and
upon resumption of operation of the cyber-physical system following the at least one reset, determine a post-reset state of the one or more components of the cyber-physical system based, at least in part, on mechanical attributes of the mechanical apparatus following the at least one reset resulting from inertia of the mechanical apparatus during the at least one reset.

14. The cyber-physical system of claim 13, wherein the at least one controller configured to cause the at least one reset is configured to:
cause recurring resets for the one or more components of the cyber-physical system.

15. The cyber-physical system of claim 13, wherein the at least one controller configured determine the post-reset state of the one or more components is configured to:
determine the post-reset state of the one or more components based further on one or more previous inputs received by the cyber-physical system prior to a beginning of the at least one reset.

16. The cyber-physical system of claim 13, wherein the at least one controller is further configured to:
select one of multiple available process variants for at least one process implemented by the cyber-physical system.

17. The cyber-physical system of claim 16, wherein the at least one controller configured to select the one of the multiple available process variants is configured to:
provide the multiple available process variants according to one or more of: leakage-resilient layout randomization techniques, isomeron techniques, instruction set randomization techniques, or any combination thereof.

18. The cyber-physical system of claim 16, wherein the at least one controller is further configured to:
terminate use of the selected one of the multiple available process variants for the at least one process upon a next reset of the cyber-physical system;
select another of the multiple available process variants for the at least one process is for execution by the at least one controller upon a next resumption of the operation of the cyber-physical system following the next reset.

19. The cyber-physical system of claim 13, further comprising:
one or more sensors of the cyber-physical system to obtain measurements indicative of a state of one or more components of the cyber-physical system;
wherein the at least one controller is further configured to:

determine respective estimates of the state corresponding to one or more components of the cyber-physical system based on the measurements from the one or more sensors; and wherein the at least one controller configured to cause the at least one reset is configured to reset the at least one controller in response to a determination of a discrepancy between two or more estimates of the state corresponding to the one or more components determined from the respective measurements.

20. The cyber-physical system of claim 19, wherein the one or more sensors configured to obtain the measurements are configured to:

obtain measurements from multiple engine position decoders indicative of an engine state of an engine.

21. The cyber-physical system of claim 13, wherein the at least one controller is further configured to:

periodically re-compute state data for the one or more components of the cyber-physical system.

22. The cyber-physical system of claim 21, wherein the at least one controller configured to periodically re-compute the data for the one or more components is configured to:

periodically re-compute a task schedule for an engine, the task schedule comprising control signals to control one or more of: an engine ignition task, or an engine injection task.

23. The cyber-physical system of claim 13, wherein the at least one controller configured to cause the at least one reset for the one or more components of the cyber-physical system is configured to perform one or more of:

re-boot, at least in part, the one or more components of the cyber-physical system; or restore a previously saved state for the one or more components of the cyber-physical system.

24. A non-transitory computer readable media programmed with instructions, executable on a processor, to:

cause at least one reset for one or more components of a cyber-physical system, the cyber-physical system comprising a mechanical apparatus with at least one of a mechanical input or a mechanical output, and at least one controller to control operations of at least one of the mechanical apparatus and inhibit computing-based attacks on the cyber-physical system; and determine, upon resumption of operation of the cyber-physical system following the at least one reset, a post-reset state of the one or more components of the cyber-physical system based, at least in part, on mechanical attributes of the mechanical apparatus following the at least one reset resulting from inertia of the mechanical apparatus during the at least one reset.

* * * * *